United States Patent [19]

Mitsuhashi et al.

[11] Patent Number: 5,107,381
[45] Date of Patent: Apr. 21, 1992

[54] AUTOMATIC TRACKING CONTROL FOR MAGNETIC RECORDING AND/OR REPRODUCING APPARATUS WITH REFERENCE PHASE SETTING CAPABILITY

[75] Inventors: Yasuo Mitsuhashi; Takashi Mishima, both of Nagaokakyo, Japan

[73] Assignee: Mitsubishi Denki Kabushiki Kaisha, Tokyo, Japan

[21] Appl. No.: 228,166

[22] Filed: Aug. 4, 1988

[30] Foreign Application Priority Data

| Aug. 4, 1987 | [JP] | Japan | 62-195703 |
| Oct. 13, 1987 | [JP] | Japan | 62-258616 |
| Oct. 29, 1987 | [JP] | Japan | 62-274190 |
| Jan. 19, 1988 | [JP] | Japan | 63-009961 |
| Jan. 19, 1988 | [JP] | Japan | 63-009962 |

[51] Int. Cl.$^5$ .......................... G11B 21/04
[52] U.S. Cl. .................... 360/70; 360/77.53
[58] Field of Search ............. 360/77.01, 77.06, 77.13, 360/70, 73.09, 18, 19

[56] References Cited

U.S. PATENT DOCUMENTS

| 4,055,849 | 10/1977 | Hickok | 360/70 X |
| 4,104,684 | 8/1978 | Wakami et al. | 360/73.09 X |
| 4,127,881 | 11/1978 | Wakami et al. | 360/70 |
| 4,568,986 | 2/1986 | Furuhata et al. | 360/10.2 |
| 4,581,658 | 4/1986 | Azuma et al. | 360/10.2 |
| 4,607,293 | 8/1986 | Okada et al. | 360/19.1 X |
| 4,760,475 | 7/1988 | Wong et al. | 360/77.13 |

FOREIGN PATENT DOCUMENTS

| 55-51256 | 12/1980 | Japan. |
| 55-51257 | 12/1980 | Japan. |
| 57-120226 | 7/1982 | Japan. |
| 58-1843 | 1/1983 | Japan. |
| 58-154985 | 9/1983 | Japan. |
| 60-163224 | 8/1985 | Japan. |
| 61-29282 | 2/1986 | Japan. |

Primary Examiner—Alan Faber
Assistant Examiner—David L. Robertson

[57] ABSTRACT

An automatic tracking control system for use in a magnetic recording and/or reproducing apparatus, which system includes a servo control circuit for controlling a tracking phase of a rotary head assembly; a search control circuit for causing the servo control circuit to vary the tracking phase in a predetermined quantity thereby to make a search so as to reciprocate within a predetermined tracking phase area; a detecting circuit for detecting envelope voltage values of an audio signal and a video signal reproduced for each search point and summing such signals together to provide a composite envelope value; and a reference tracking phase setting circuit for detecting the tracking phase, at which an optimum tracking can be attained when the reproduced signals are integrated from the composite envelope value, thereby to set a reference tracking phase which provides a reference value to the servo control circuit.

29 Claims, 22 Drawing Sheets (Direction of Revolution)

$g_1 < g_0$ (Self-recording & Self-reproduction)

(Rec/Repro. Head)

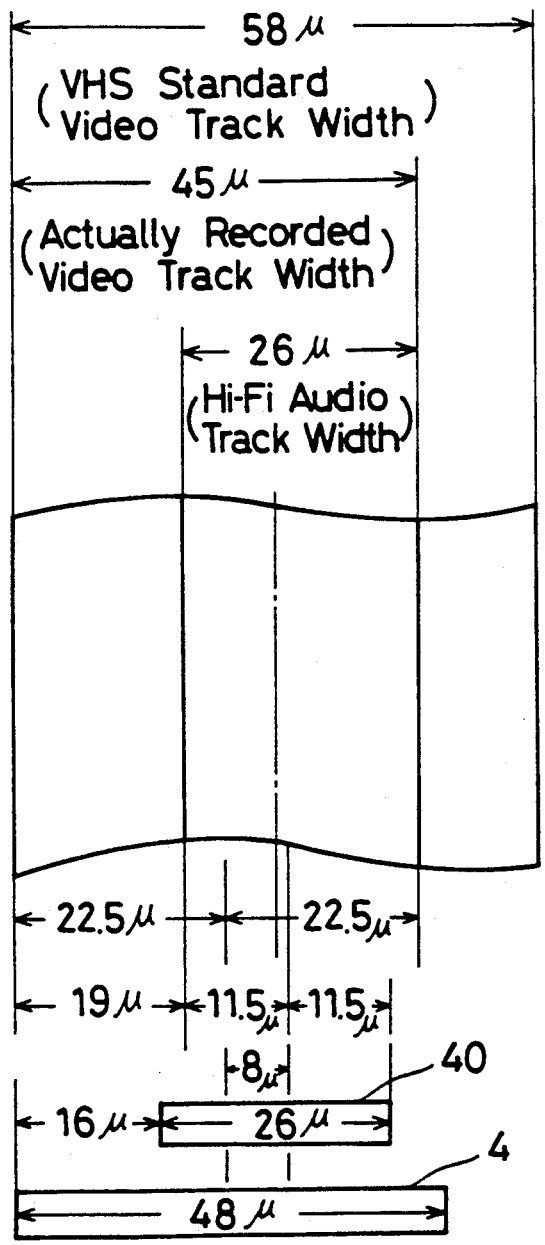
Fig. 6(a) PRIOR ART
(Borrowed-recording & Borrowed-reproduction)
Fig. 6(b) PRIOR ART
(Repro. Head)
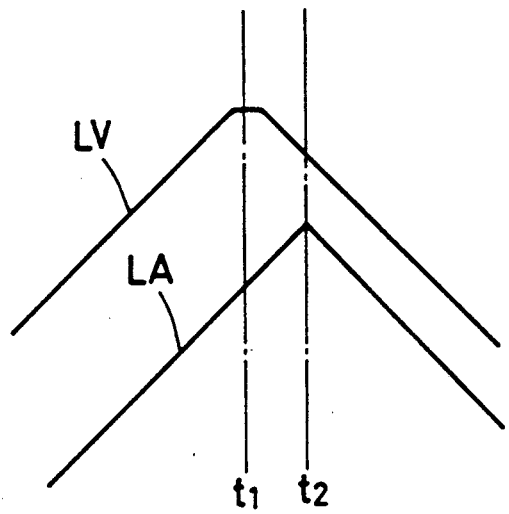
Fig. 6(c) PRIOR ART

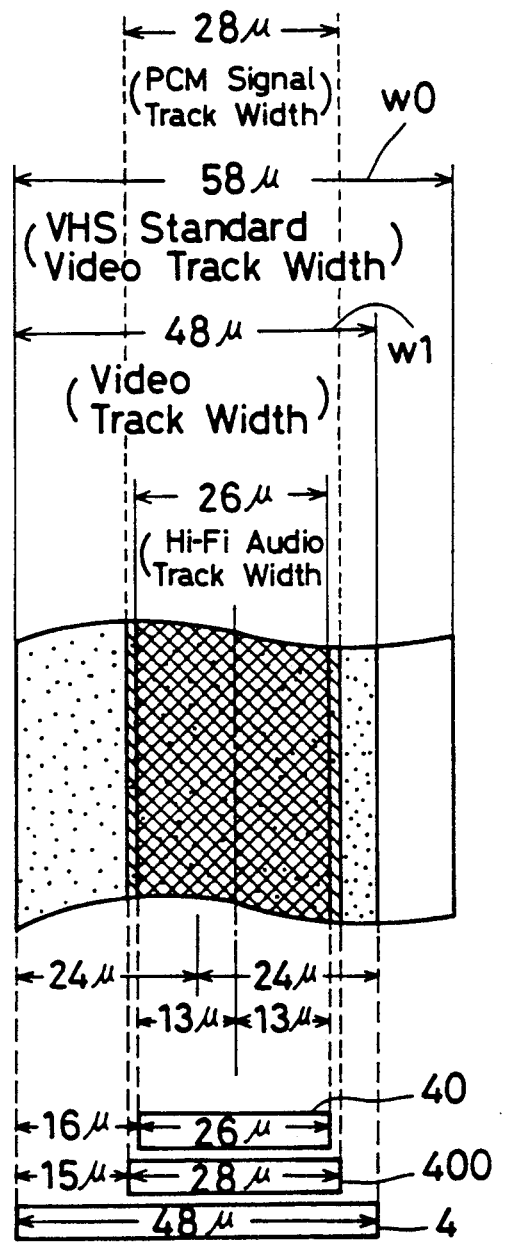
Fig. 9(a)
PRIOR ART
(Self-recording / Self-reproduction)
Fig. 9(b)
PRIOR ART
(Rec/Repro. Head)
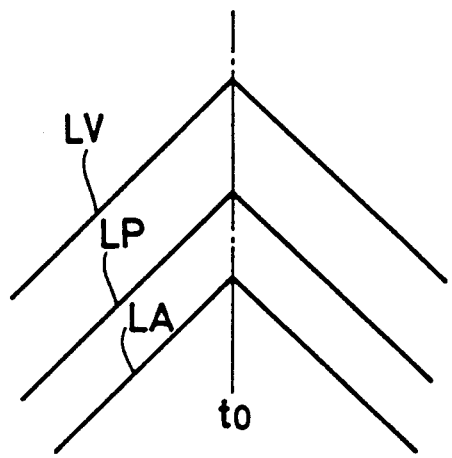
Fig. 9(c)
PRIOR ART

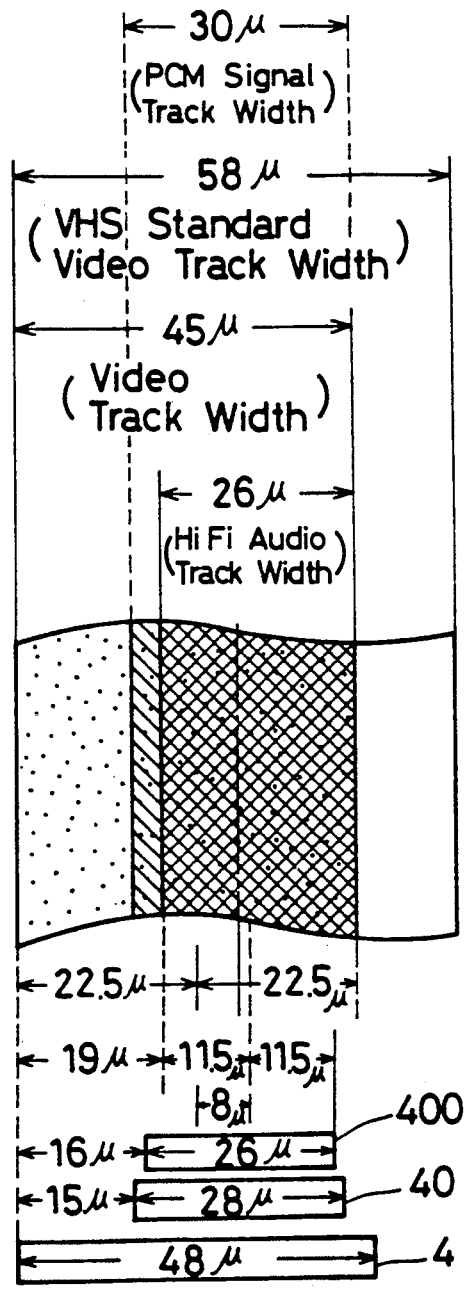
Fig. 10(a)
PRIOR ART
(Borrowed-recording & Borrowed-reproduction)
Fig. 10(b)
PRIOR ART
(Repro. Head)
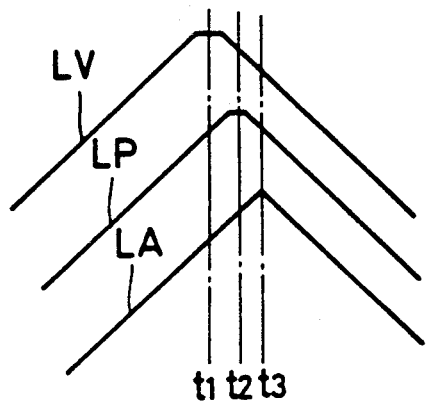
Fig. 10(c)
PRIOR ART {
P : Predetermined Subtract $L_0$ : Composite Envelope Value at Starting Point $J_{00}$ : Predetermined Discriminating Value at Starting Point (Set at $J \ll L$)

$L_{-1} \sim L_{-3}$ : Composite Envelope Values when Searched in a direction in which Tracking Phase is decreased.

$L_1 \sim L_1$ : Composite Envelope Values when Searched in a direction in which Tracking Phase is increased.
}

AUTOMATIC TRACKING CONTROL FOR MAGNETIC RECORDING AND/OR REPRODUCING APPARATUS WITH REFERENCE PHASE SETTING CAPABILITY

BACKGROUND OF THE INVENTION

1. Field of the Invention

The present invention generally relates to a magnetic recording and/or reproducing apparatus of a type having a so-called double-level recording or triple-level recording capability and, more particularly, to a tracking control system for the magnetic recording and/or reproducing apparatus.

The magnetic tape player double-level recording model is well known as the type wherein video and audio information are recorded on outer and inner strata of a length of magnetic tape, respectively. In reproducing the video and audio information recorded on the outer and inner strata of the length of magnetic tape, at least one head assembly comprised of a video pick-up head and an audio pick-up head, positioned on the trailing side of the video pick-up head with respect to the direction of scan, is utilized to scan the length of magnetic tape with the video and audio pick-up heads picking up the video and audio information, respectively. This technique is widely used in a Hi-Fi video tape player operable according to the VHS standards.

On the other hand, examples of an automatic tracking control system used in the currently commercially available magnetic tape player of a single-level recording model are disclosed in the Japanese Patent Publications examined Nos. 55-51256 and 55-51257, the Japanese Laid-open Patent Publications Nos. 57-120226, 58-1843, 58-154985, 60-163224 and 61-29282. Among them, Japanese Patent Publications examined Nos. 55-51256 and 55-51257 are most relevant to the present invention and a schematic block circuit diagram thereof is reproduced in FIG. 1 of the accompanying drawings. This prior art automatic tracking control system shown in FIG. 1 will now be discussed with the aid of FIGS. 2 and 3 which illustrate a phase versus envelope voltage characteristic and a tracking phase versus envelope voltage characteristic, respectively, both exhibited by the prior art automatic tracking control system.

Referring first to FIG. 1, a length of magnetic tape 1 has video information 2 and control signals 3 both recorded thereon. The video information 2 so recorded is comprised of recorded tracks extending parallel to each other and slantwise relative to the longitudinal axis of the length of magnetic tape 1, whereas the control signal 3 utilizable for the tracking servo control are recorded in spaced relation with each other and along one of the opposite side edges of the length of magnetic tape 1.

A rotary drum 6 supported for rotation about the center thereof and adapted to be driven in one direction by a drum drive motor 8 controlled by a drum motor control circuit 7 carries rotary magnetic video heads 4a and 4b in spaced relation to each other for rotation together with the rotary drum 6 at a predetermined peripheral velocity for sequentially picking up video signals recorded on the tracks during the scanning operation in which the rotary drum 6 is driven at high speed while the length of magnetic tape 1 is transported in one predetermined direction, shown by the arrow 15, from a tape supply reel towards a tape take-up reel. The control signals 3 are, during the movement of the length of magnetic tape 1, successively picked up by a stationary control head 5 fixedly supported so as to confront the edge of the length of magnetic tape 1 where the control signals 3 are recorded.

During the scanning operation, the length of magnetic tape 1 is transported in the direction of the arrow 15 by a capstan 14 drivingly coupled with a capstan drive motor 9 through a drive pulley 12 and an endless belt 13, said capstan drive motor 9 having a frequency generator 10 capable of generating a frequency signal having a frequency proportional to the peripheral velocity of the rotary drum 6, which frequency signal is hereinafter referred to as a FG signal. The capstan drive motor (hereinafter referred to as CP motor) 9 is controlled by a capstan drive motor control circuit 11 in dependence on the FG signal generated from the frequency generator 10.

Each control signal 3 picked up by the stationary control head 5 is applied to a phase comparator 17 after having been amplified by an control amplifier 16. In addition to the amplified control signal, the phase comparator 17 receives through a phase adjusting circuit 20 a phase signal generated from a stationary detector head 19 operable to detect a magnetic flux emanating from a magnet piece 18 secured to the rotary drum 6 for rotation together therewith, said phase signal being indicative of the phase of revolution of the rotary drum 6.

A difference signal outputted from the phase comparator 17 is applied to the capstan drive motor control circuit 11 for controlling the capstan drive motor 9, then driven at about a predetermined speed by the control circuit 11, thereby to finely adjust the speed of movement of the length of magnetic tape 1 so that the phase of rotation of the rotary magnetic video heads 4a and 4b and the phase of the reproduced control signal 3 can have a predetermined phase relationship with each other determined by the phase adjusting circuit 20. Therefore, the rotary magnetic video heads 4a and 4b can successively scan recorded tracks 2 as allocated by the phase adjusting circuit 20.

On the other hand, a video FM signal reproduced by the rotary magnetic video heads 4a and 4b is, after having been extracted by a rotary transformer 21, amplified by a head amplifier 22 and is then supplied to an envelope detecting circuit 23 where the amplified video FM signal is subjected to an envelope detection, a detected signal from the envelope detecting circuit 23 being subsequently supplied to an integrating circuit 28 and also to a comparator 25. The output from the head amplifier 22 is also supplied to a peak hold circuit 24 operable to hold a maximum value of an envelope signal. An output from this peak hold circuit 24 and an output from the envelope detecting circuit 23 are supplied to the comparator 25 operable to compare the output voltage Vp of the output from the peak hold circuit 24 and the output voltage Ve of the output from the envelope detecting circuit 23 and to determine whether the difference between the output voltages Vp and Ve is higher than a threshold value eo or whether the difference in voltage is lower than the threshold value eo. An output from the comparator 25 is supplied to a differential circuit 26 which in turn outputs a positive or negative pulse signal each time the output from the comparator 25 reverses.

A flip-flop 27 interposed between the differential circuit 26 and the integrating circuit 28 is adapted to be triggered only when the differential circuit 26 applies the negative pulse signal, thereby to reverse the negative or positive output voltage level. An output from the flip-flop 27 is subsequently supplied to, and integrated by, the integrating circuit 28 which then provides an increasing or decreasing signal dependent on the voltage polarity of the output from the flip-flop 27, which increasing or decreasing signal is used to control the phase of the phase adjusting circuit 20.

With reference to FIG. 2, assuming that the phase of the phase adjusting circuit 20 is at a point a, the voltage of the output from the flip-flop 27 is of a positive voltage level, and the output from the integrating circuit 28 is being increased, the phase of the phase adjusting circuit 20 lies in a direction of increase towards a point b and then towards a point c. In correspondence therewith, the output from the envelope detecting circuit 23 increases progressively to increase the envelope voltage Vp to a maximum value Vpmax and then decreases to decrease the envelope voltage Vp down to a value lower than the maximum value Vpmax. When the phase of the phase adjusting circuit 20 subsequently attains a point d, the difference between the envelope voltage Ve of the envelope detecting circuit 23 and the maximum value Vpmax of the hold voltage Vp of the peak-hold circuit 24 becomes equal to the predetermined threshold value eo and, therefore, the comparator 25 reverses its output level from positive to negative, with the consequence that the differential circuit 26 generates the negative pulse causing the flip-flop 27 to be reversed to a negative voltage level. As a result thereof, the output from the integrating circuit 28 is caused to decrease and the phase of the phase adjusting circuit 20 is caused to decrease again towards the point c. The phase of the phase adjusting circuit 20 shifts from the point b to the point d, and the output voltage Ve of the envelope detecting circuit 23 is controlled to shift between the values Vpmax and eo in a direction shown by the arrows. Thus, if the threshold value eo is carefully selected to an appropriate value, the tracking control hitherto performed manually can be automatically performed.

Since the prior art automatic tracking control system is so constructed as hereinabove discussed, the envelope voltage L obtained by varying the tracking phase as shown in FIG. 3 does, in the case of, for example, an SP mode exhibiting a characteristic shown by a curve A in FIG. 3, vary from a value L0 to a value L1 as the tracking phase increases from t0 to t1, and remains without changing when the voltage thereof increases. When the tracking phase varies from t2 to t3, the level at which the value L3 becomes lower than the value L2 is detected, which value L2 is determined to be the maximum value and the tracking phase is set at t2.

Since when the envelope voltage falls it is immediately set to the maximum value as hereinabove described, it has been problematic that, where the envelope voltage exhibits a two-peak curve having a peak point at two locations, even though a higher peak is found in the right-hand direction, the tracking phase is set at a lower peak position on the left-hand side and, therefore, the tracking phase so obtained is not always appropriate.

In the case of an EP mode exhibiting a characteristic shown by a curve B in FIG. 3, since the tracking phase is varied until the maximum value of the envelope voltage is found, there is a problem in that it takes a relatively long time to converge at the maximum value and, moreover, where a flat region at the top of the characteristic curve is varying, the maximum value cannot be fixed, tending to fluctuate from an optimum value.

Because of the reasons discussed above, when the length of magnetic tape recorded in one magnetic tape player is to be reproduced with a different magnetic tape player, the best track position can not be assured since the track width of the video heads in the magnetic tape player used to reproduce differs from the recorded track width of the magnetic tape.

Where the magnetic tape player is of the double-level recording type such as a Hi-Fi video tape player according to the VHS scheme, wherein video and Hi-Fi audio information are recorded by different magnetic heads on outer and inner strata of a length of magnetic tape, respectively, and if the above described control system is employed only for the video signal, the tracking of the Hi-Fi audio signal will become insufficient to such an extent as to result in lowered signal-to-noise ratio, thereby posing a problem in that the magnetic tape player in which the above described control system is employed only for the video signal will no longer be utilizable. The reason therefor will now be discussed.

Before the reason is discussed, the principle of double-level recording employed in a Hi-Fi magnetic tape player will be described with reference to FIGS. 4(a) and 4(b).

As shown in FIG. 4(a), the video heads 4a and 4b mounted on the rotary drum 6 are spaced 180° from each other about the axis of rotation of the drum 6 and, similarly, Hi-Fi audio heads 40a and 40b having a gap go of about 0.8 micrometer in width with respect to the direction of transport of the length of magnetic tape 15 as shown in FIG. 4(b) are mounted on the rotary drum 6 while spaced 180° from each other about the axis of rotation of the drum 6, the video heads 4a and 4b being offset a predetermined distance (for example, 16 micrometers) relative to the audio heads 40a and 40b as shown in FIG. 5(b) in a direction parallel to the axis of rotation of the drum 6.

A relatively high recording current is allowed to flow across the gap of each audio head 40a and 40b to record Hi-Fi audio information on an inner stratum of a magnetic layer 1b of about 4 micrometers in thickness, formed on a length of base film 1a of about 16 micrometers in thickness. Subsequently, another recording current is allowed to flow across the gap g1 (0.3 micrometer in width) of each of the video heads 4a and 4b to record video information on an outer stratum, immediately above the above mentioned inner stratum, of the same magnetic layer 1b.

The manner in which the video and audio information are recorded on the length of magnetic tape 1 in the double-level fashion represents such a pattern as shown in FIG. 5(a) when viewed from the magnetic layer 1b of the length of magnetic tape 1. FIG. 5 applies where video and audio information recorded on the length of magnetic tape with the magnetic tape player employing the video and audio heads 4a, 4b and 40a, 40b arranged in the manner as shown in FIG. 4(a) is reproduced by the same magnetic tape player (this situation being hereinafter referred to as "self-recording and self-reproduction"), and tracking performed by such magnetic tape player is schematically illustrated in FIG. 5(c). As shown in FIG. 5(c), the tracking position at which the envelope LV of the video signal attains a maximum value and the tracking position at which the envelope LA of the Hi-Fi audio signal attains a maximum value lie at the same point t0 and, therefore, in order to control to the optimum tracking position, it suffices to determine the maximum value of the envelope of either one of the video signal and the audio signal. Accordingly, in the case of self-recording and self-reproduction, the automatic tracking control can be attained even with the prior art system whose principle has been described with reference to FIG. 2.

However, where the length of magnetic tape is reproduced by the magnetic tape player which is different from the magnetic tape player used to record such length of magnetic tape and wherein the video and audio heads are offset relative to each other at the different levels as shown in FIG. 6(a) (this situation being hereinafter referred to as "borrowed-recording and borrowed-reproduction"), the tracking position t1 at which the envelope LV of the video signal attains a maximum value and the tracking position t2 at which the envelope LA of the Hi-Fi audio signal attains a maximum value displaces relative to each other as shown in FIG. 6(c).

Problems similar to the above described problem can be found in the triple-level recording system wherein a pair of video heads and two pairs of audio heads are employed and arranged as shown in FIGS. 7(a) and 7(b) for recording, in a manner as shown in FIG. 7(b), a Hi-Fi audio signal, a PCM color signal and a luminance signal, all frequency-modulated in a manner as shown in FIG. 8.

More specifically, in the case of self-recording and self-reproduction as shown in FIG. 9, the respective positions at which the envelope LV of the luminance signal, the envelope LP of the PCM signal and the envelope LA of the Hi-Fi audio signal attain maximum values coincide at the point t0 as shown in FIG. 9(c) and, therefore, in order to control to the optimum tracking, it suffices to determine the maximum value of one of the luminance signal, the PCM color signal and the Hi-Fi audio signal.

However, in the case of borrowed-recording and borrowed-reproduction as shown in FIG. 10, the respective positions at which the envelope LV of the luminance signal, the envelope LP of the PCM color signal and the envelope LA of the Hi-Fi audio signal attain maximum values displace from each other as shown in FIG. 10(c).

In general, according to the VHS standards, the video track width w0 is fixed at 58 micrometers. However, the actually recorded video track width w1 is often found to be smaller than 58 micrometers, and the difference in level between the video heads and the Hi-Fi audio heads varies from one magnetic tape player to another, and, therefore, it is often found that the relationship among the tracking positions t0, t1, t2 and t3 correspondingly varies from one magnetic tape player to another.

According to the automatic tracking control system such as shown in and described with reference to FIG. 1, since the envelope signal is processed through both of the peak hold circuit and the detecting circuit and is then analog-processed in the later stages, the circuitry tends to be complicated and unstable with respect to change in ambient temperature. Moreover, since the circuitry is very sensitive to the envelope to such an extent that, although being controlled automatically, the tracking tends to shift slowly but assuredly, the prior art automatic tracking control system has not yet been employed in any commercially available magnetic tape players.

SUMMARY OF THE INVENTION

The present invention having been devised to substantially eliminate the above discussed problems is aimed at providing an automatic tracking control system for a magnetic recording and/or reproducing apparatus, which is excellent in tracking performance, which is effective to accomplish the automatic tracking accurately even in an apparatus of either the double-level high density recording type or the triple-recording high density type, which is also effective to accomplish the automatic tracking accurately even in the apparatus of a type wherein one or more video recording and/or reproducing heads each having a relatively large magnetic gap for accomplishing still (frozen) and/or slow-motion reproduction, and which is effective to accomplish the automatic tracking perfectly at high tracking precision.

In order to accomplish the above described object, the present invention provides an automatic tracking control system for use in a magnetic recording and/or reproducing apparatus of a type having plural level recording capability such as double-level or triple-level recording capability, which system comprises a servo control means for controlling a tracking phase of a rotary head assembly, a search control means for causing the servo control means to vary the tracking phase in a predetermined quantity thereby to make a search so as to reciprocate within a predetermined tracking phase area, a detecting means for detecting envelope voltage values of an audio signal and a video signal reproduced for each search point, and summing such signals together to provide a composite envelope value, and a reference tracking phase setting means for detecting the tracking phase, at which an optimum tracking can be attained when the reproduced signals are integrated from the composite envelope value, thereby to set a reference tracking phase which provides a reference value to the servo control means.

According to the present invention, the reference tracking phase setting means controls the search control means to search the tracking position of the rotary head assembly, to detect the status of change at each search point of the composite envelope value added with the envelope value obtained by converting into the digital signal the envelope detected voltage value of the reproduced signal at each search point, to select the tracking phase at which the tracking condition of each reproduced signal attains an optimum condition as a whole in dependence on this characteristic of change, or at which the tracking condition in which emphasis is placed on a desired reproduced signal can be attained, and to provide it as the reference tracking phase to the servo control means.

As hereinabove described, since the reference tracking phase is set in reference to the characteristic of change within the search area of the composite envelope value formed by the envelope detected signal of each reproduced signal, the tracking control which should as a whole attain an optimum result can be obtained.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined solely by the appended claims. In the drawings, like reference numerals denote like parts in the several views, and:

FIGS. 6(a) to 6(c) are diagrams similar to FIGS. 5(a) to 5(c), but associated with borrowed-recording and borrowed-reproduction;

FIGS. 9(a) to 9(c) are diagrams similar to FIGS. 5(a) to 5(c), respectively, but associated with the triple-recording system during self-recording and self-reproduction;

FIG. 10(a) to 10(c) are diagrams similar to FIGS. 6(a) to 6(c), but associated with triple-level recording during borrowed-recording and borrowed-reproduction;

DETAILED DESCRIPTION OF THE EMBODIMENTS

Figure 1:
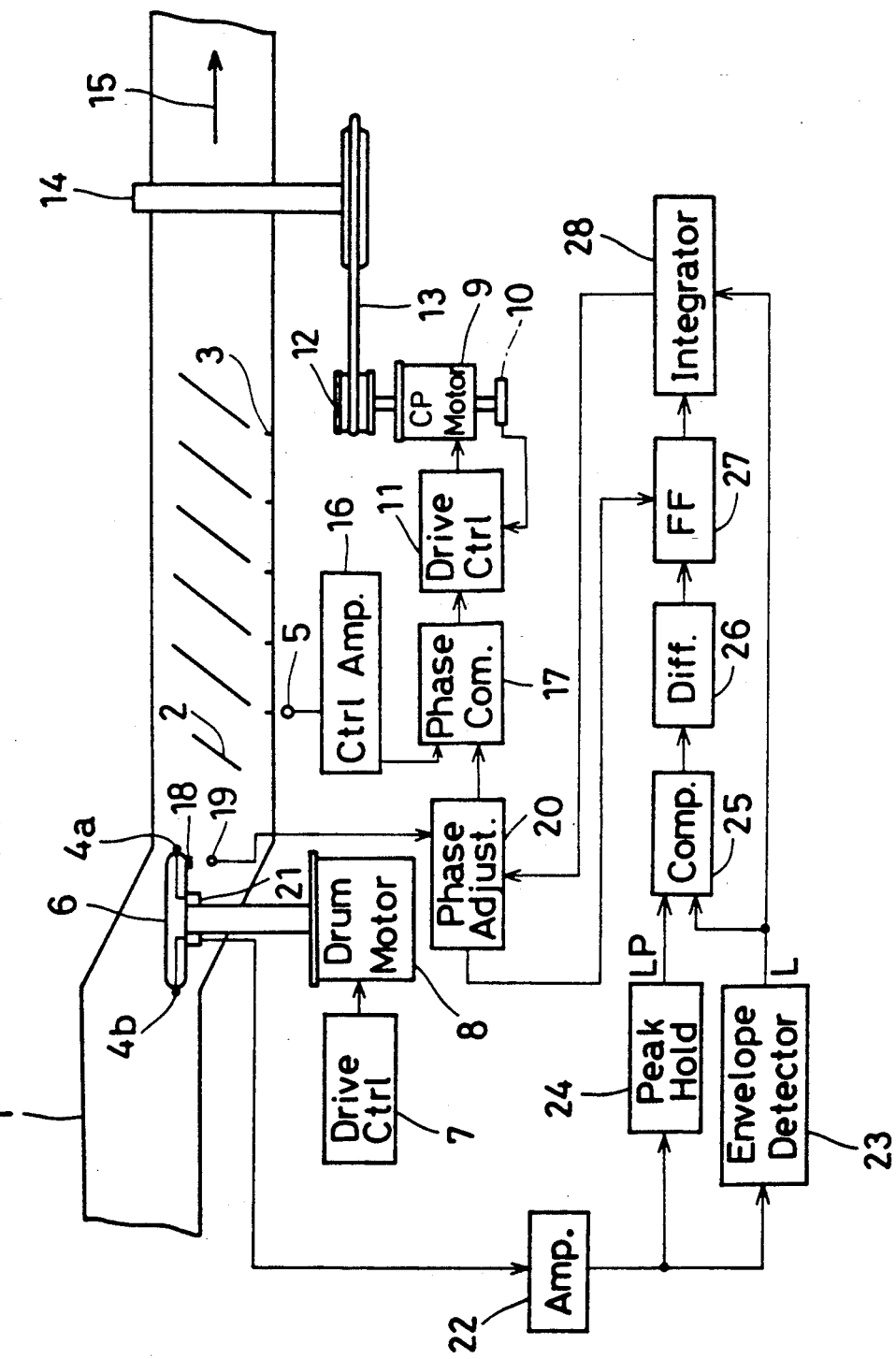
FIG. 1 is a block circuit diagram showing the prior art automatic tracking control system.
Figure 2:
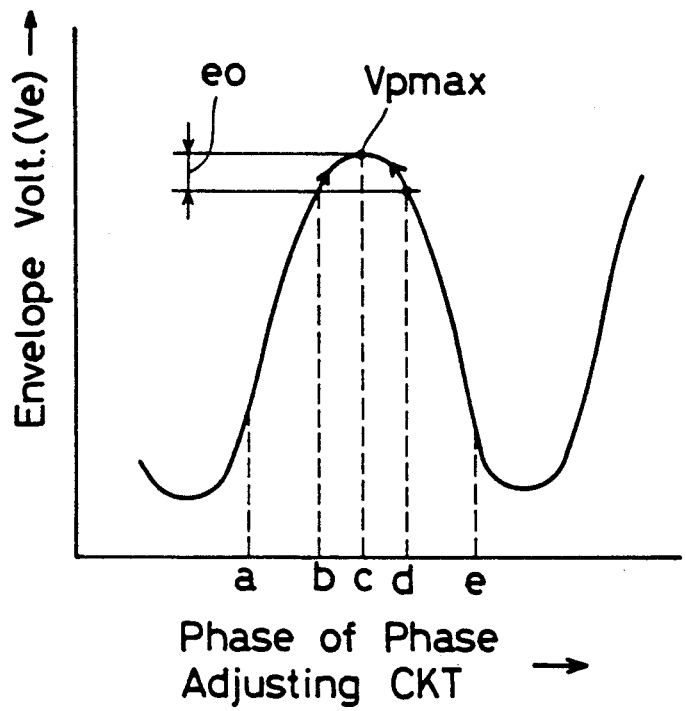
FIG. 2 is a graph showing the relationship between the phase of the phase adjusting circuit and the envelope voltage which is characteristic of the prior art automatic tracking control system.
Figure 3:
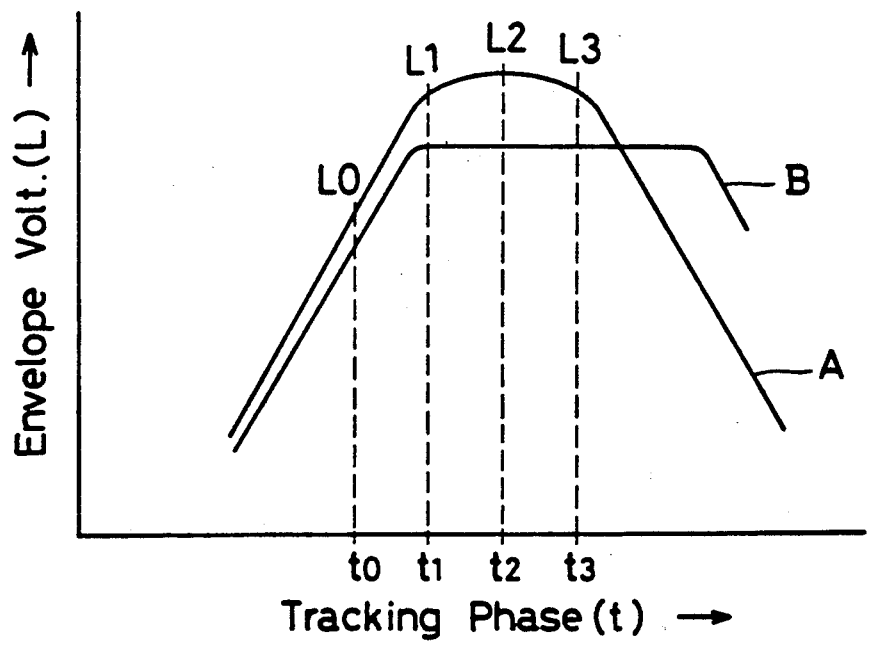
FIG. 3 is a graph showing the relationship between the tracking phase and the envelope voltage which is characteristic of the prior art automatic tracking control system.
Figure 4A:
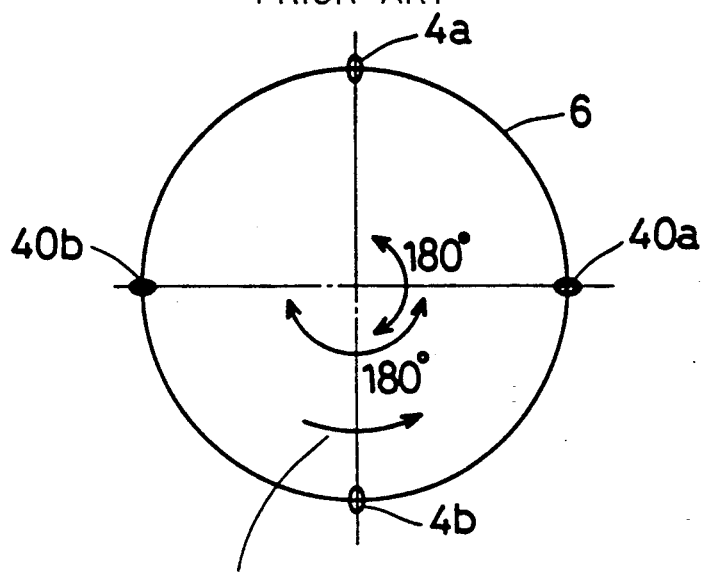
FIG. 4(a) is a schematic diagram showing the arrangement of video and audio heads on a rotary drum in the magnetic tape player having double-level recording capability.
Figure 4B:
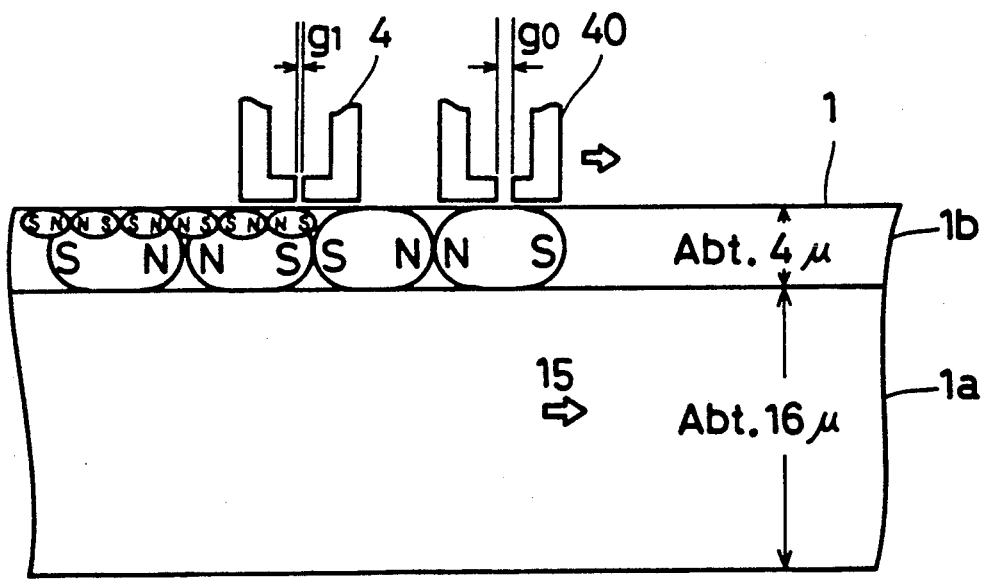
FIG. 4(b) is a schematic diagram showing how the video and audio signals are recorded on the length of magnetic tape according to the double-level recording system.
Figure 5A:
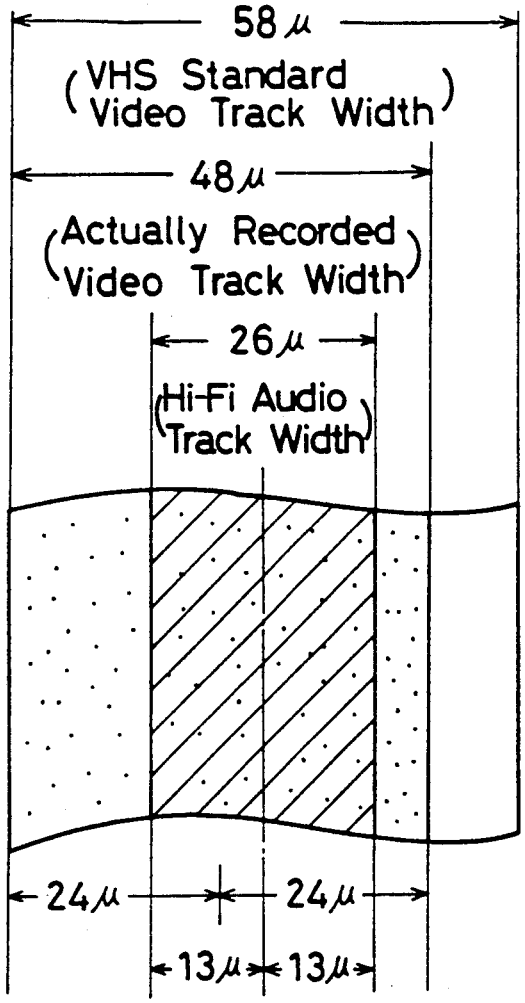
FIG. 5(a) is a diagram showing the recording pattern according to the double-level recording system.
Figure 5B:
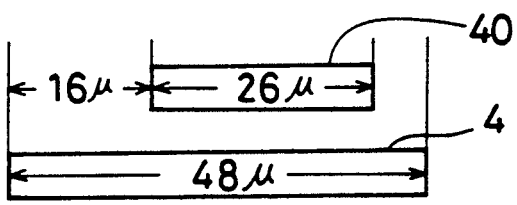
FIG. 5(b) is a diagram showing the relationship in position between the video and audio heads in the double-level recording system.
Figure 5C:
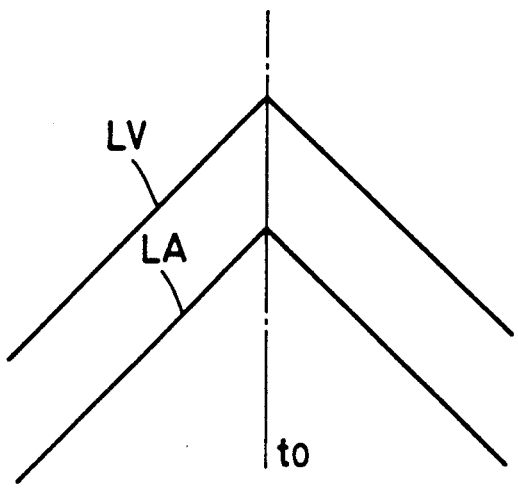
FIG. 5(c) is a diagram showing the relationship between the envelopes of the video and audio signals according to the double-level recording system.
Figure 7A:
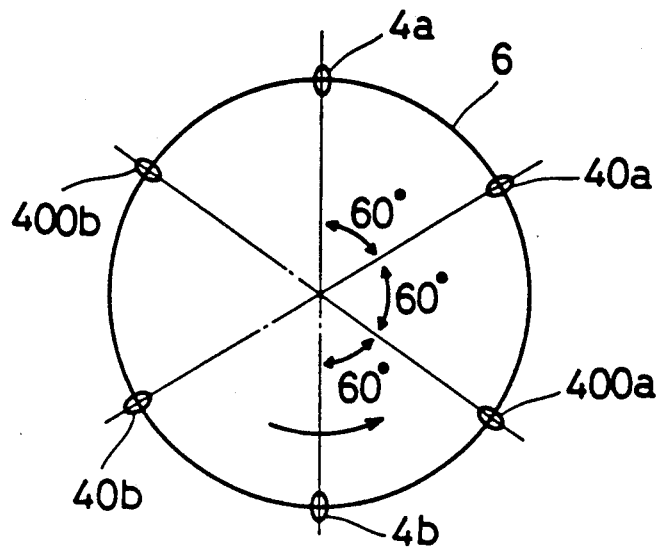
FIGS. 7(a) and 7(b) are diagrams similar to FIGS. 4(a) and 4(b), respectively, but associated with the triple-recording system.
Figure 7B:
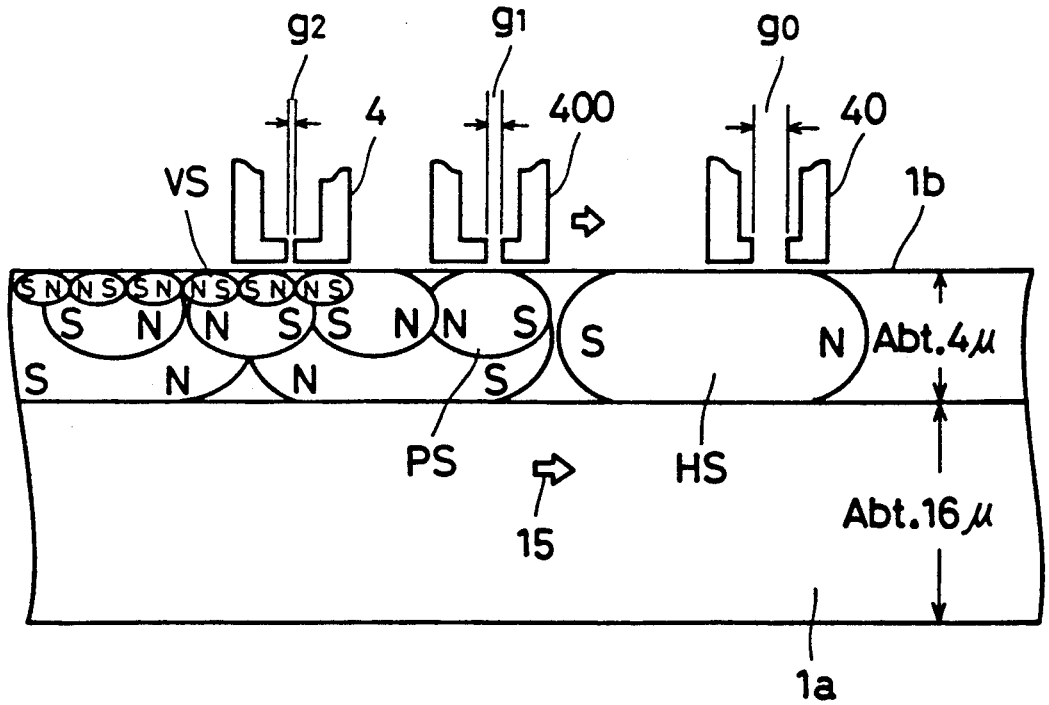
Figure 8:
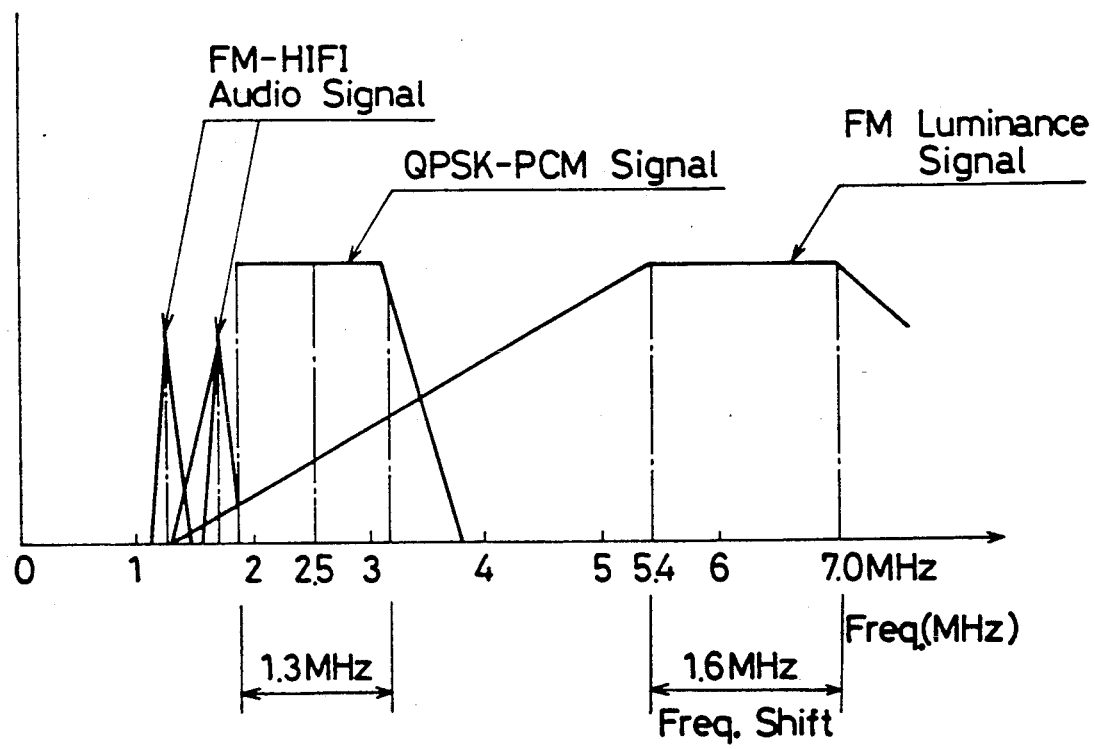
FIG. 8 is a graph showing the frequency regions of the Hi-Fi audio signal, the PCM signal and the luminance signal used in the triple-recording system.
Figure 11:
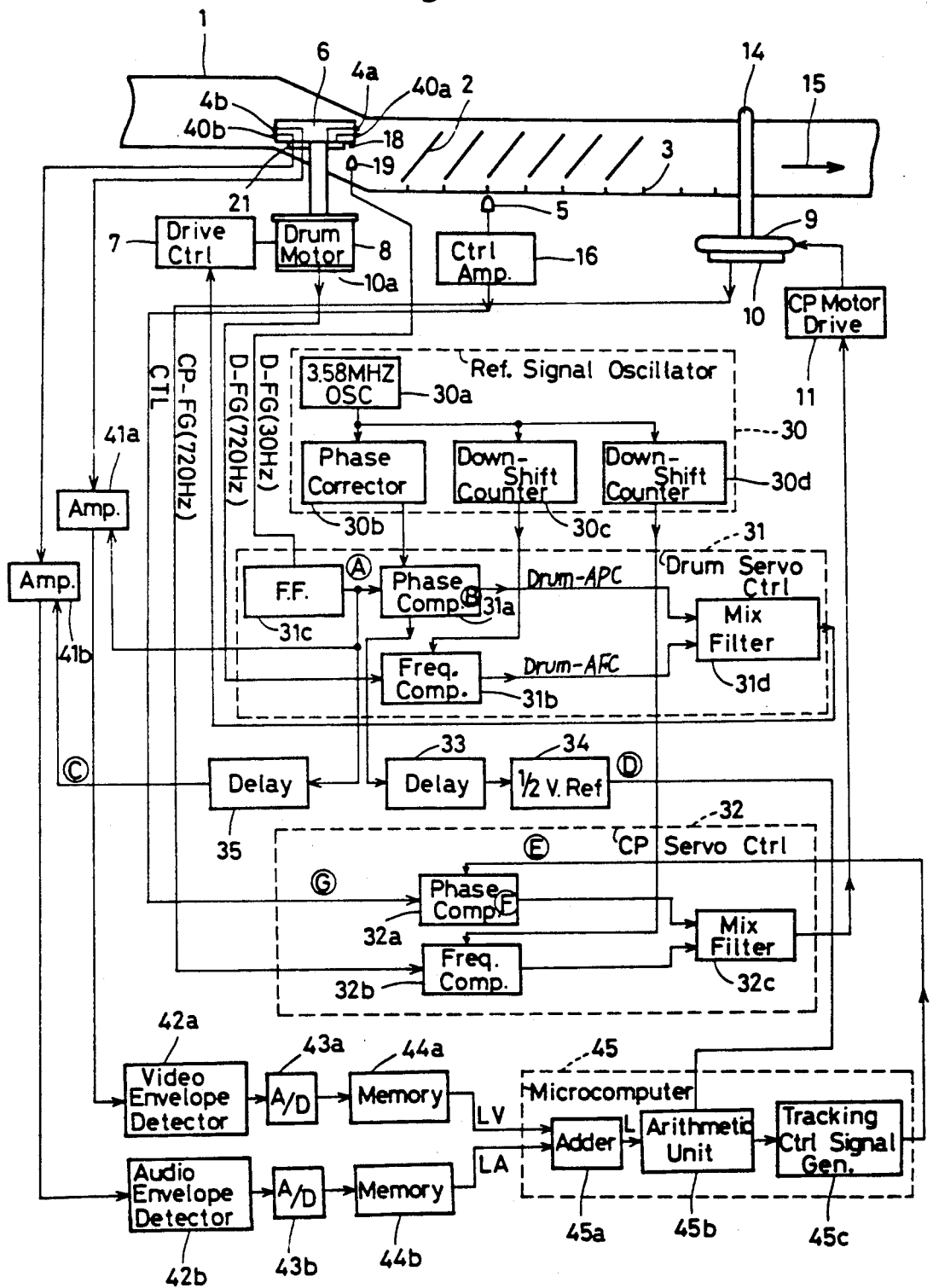
FIG. 11 is a circuit block diagram showing an automatic tracking control system according to a first preferred embodiment of the present invention.

Referring first to FIG. 11, such components of an automatic tracking control system of the present invention as designated by 1 to 11, 14 to 16, 18, 19 and 21 in this figure are identical in structure and function with those components of the prior art automatic tracking control system designated by like reference numerals in FIG. 1.

The automatic tracking control system according to the embodiment shown in FIG. 11 additionally includes a reference signal generator 30 for providing reference signals to servo control circuits for the rotary drum 6 and the capstan 14. In the case of the NTSC television system, this reference signal generator 30 comprises a 3.58 MHz oscillator 30a capable of providing a 3.58 MHz frequency signal, down-shift counters 30c and 30d for counting down this frequency signal and a phase correcting circuit 30b. The servo control circuit for the rotary drum 6 is generally identified by 31 and is operable to control the rotary drum 6 to a predetermined speed of 1,800 rpm and also to control the respective phases of rotation of the paired video heads 4a and 4b and the paired Hi-Fi audio heads 40a and 40b. This drum servo control circuit 31 comprises a drum phase comparator 31a, a drum frequency comparator 31b, a drum flip-flop signal synthesizer 31c and a mixing filter 31d operable to mix up and smooth respective outputs from the comparators 31a and 31b.

The servo control circuit for the capstan 14 is generally identified by 32 and is operable to cause the capstan 14 to rotate at a predetermined speed to permit the length of magnetic tape 1 to be transported at a predetermined speed and a predetermined tracking position. This capstan servo control circuit 32 comprises a CP phase comparator 32a, a CP frequency comparator 32b and a mixing filter 32c operable to mix up and smooth respective outputs from the comparators 32a and 32b. Reference numeral 33 represents a delay circuit for delaying a reference signal from the drum phase comparator 31a, and reference numeral 34 represents a ¼ frequency divided vertical reference signal generator for synthesizing a ¼ frequency divided vertical reference signal in reference to a delay signal from the delay circuit 33, which ¼ frequency divided vertical reference signal is utilized as reference to a tracking control signal synthesized by a microcomputer 45. Reference numeral 35 represents a delay circuit for delaying a drum flip-flop signal, generated from the drum flip-flop signal synthesizer 31c, to provide a Hi-Fi head switching signal.

Reference numeral 41a represents a video head amplifier for amplifying the video signal; reference numeral 41b represents a Hi-Fi audio head amplifier for amplifying the Hi-Fi audio signal; reference numeral 42a represents a video signal envelope detector for detecting the amplitude of the frequency-modulated video signal; reference numeral 42b represents a Hi-Fi signal envelope detector for detecting the amplitude of the frequency-modulated Hi-Fi audio signal; reference numeral 43a represents an analog-to-digital (A/D) converter for converting the video envelope detected signal, which is an analog signal, into a digital signal; reference numeral 43b represents an analog-to-digital (A/D) converter for converting the Hi-Fi audio envelope detected signal, which is an analog signal, into a digital signal; reference numeral 44a represents a memory circuit for storing the digitized video envelope signal LV; reference numeral 44b represents a memory circuit for storing the digitized audio envelope signal LA; and reference numeral 45 represents a microcomputer for synthesizing the tracking control signal by performing such processes as summing the digitalized signals LV and LA together to provide a composite envelope value L and comparing the composite envelope value L with a predetermined value j which is appropriately determined.

Figure 12:
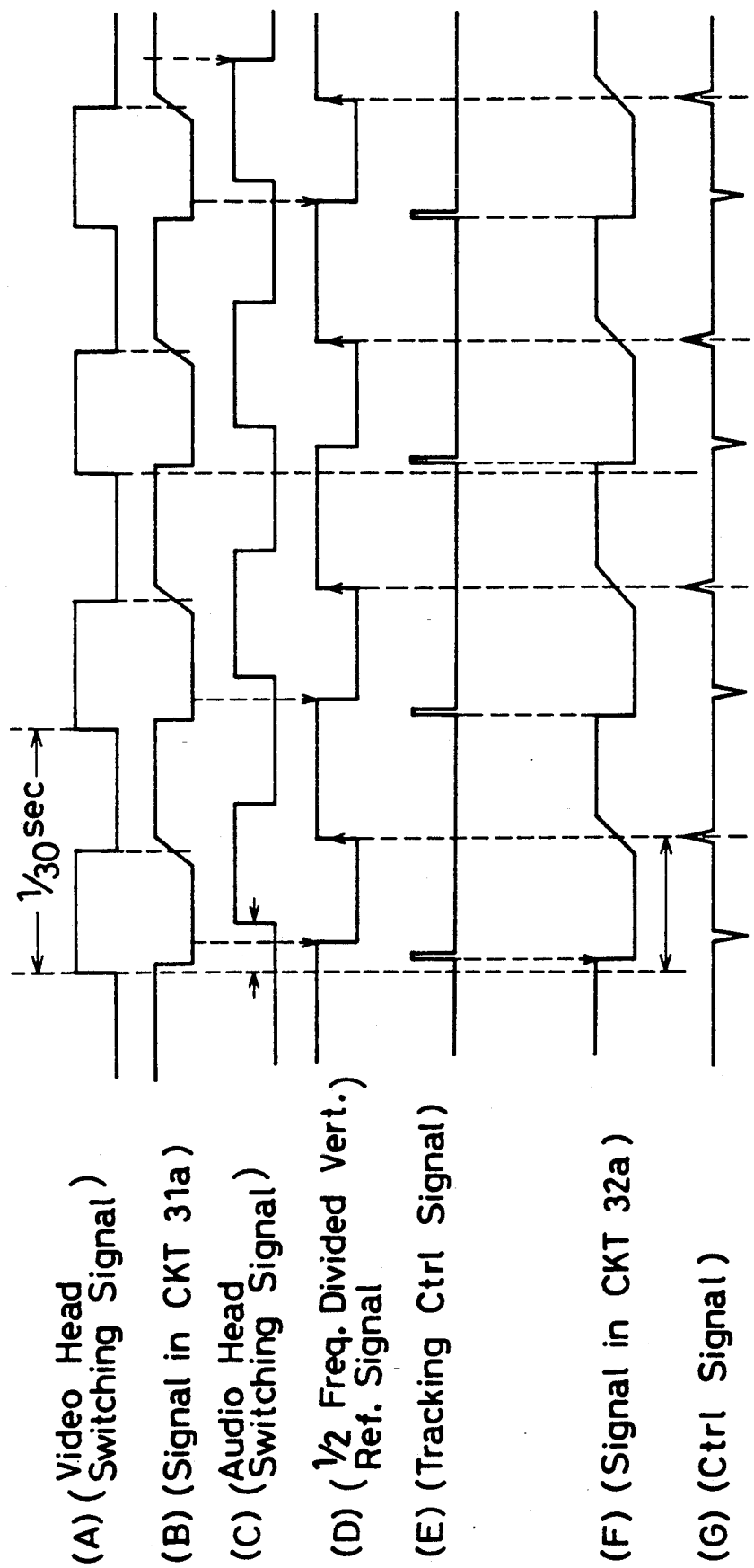
FIG. 12 is a diagram showing waveforms of various signals appearing in the circuit shown in FIG. 11.
Figure 13:
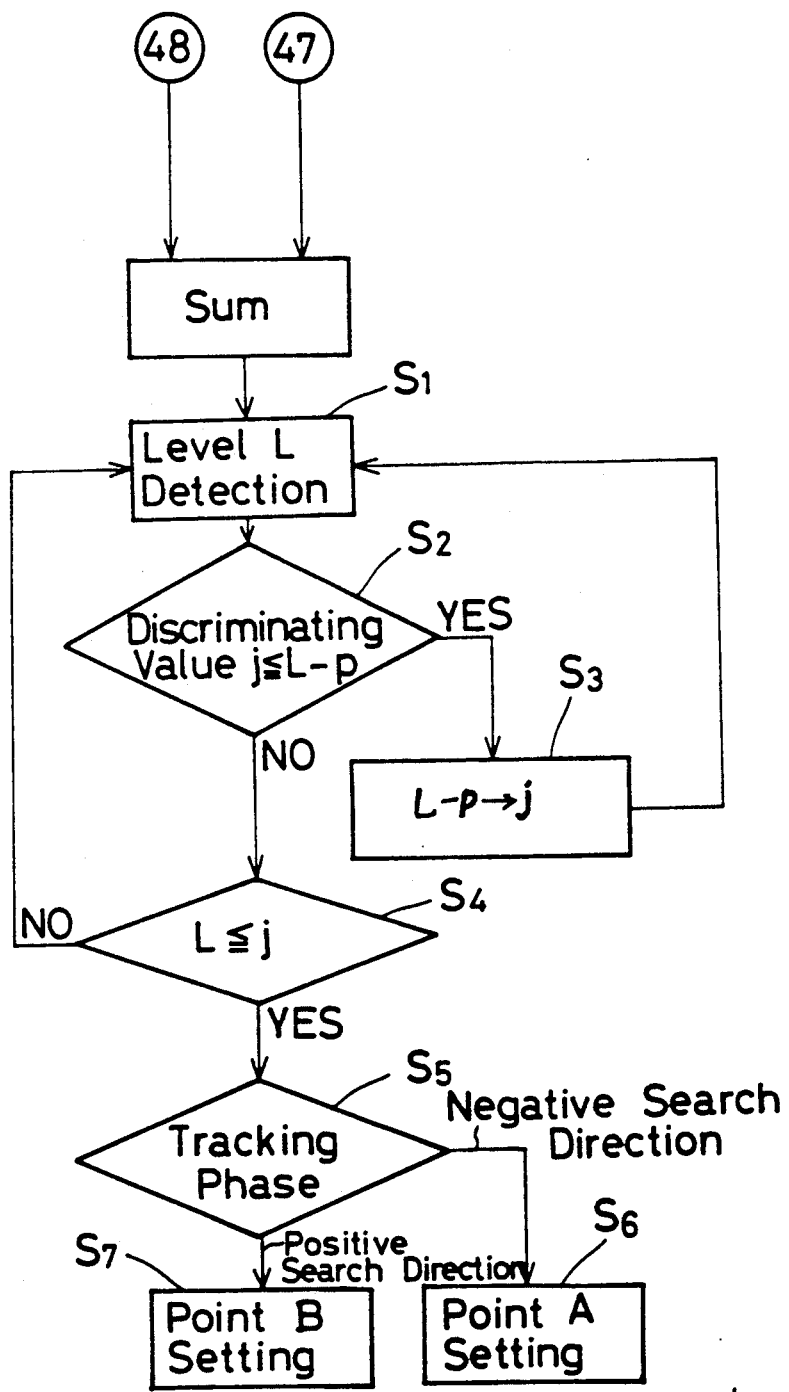
FIG. 13 is a flowchart showing the sequence of signal processing performed by a microcomputer used in the circuit of FIG. 11.
Figure 14:
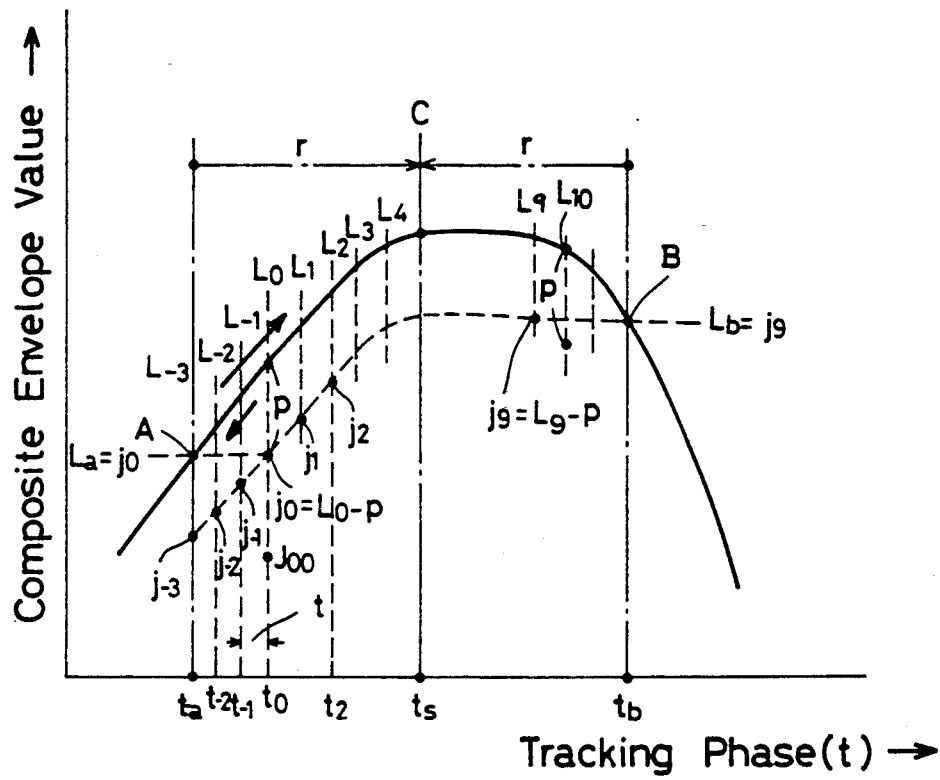
FIG. 14 is a graph showing the relationship between the tracking phase and the composite envelope value, used to explain the operation thereof.

Waveforms (A) to (G) shown in FIG. 12 represent those of various signals appearing in the circuitry shown in FIG. 11, FIG. 13 illustrates the flowchart showing the sequence of control performed by the microcomputer 45, and FIG. 14 illustrates waveforms used to explain the operation of the microcomputer 45. FIG. 15 illustrates waveforms used to shown the relationship between the envelope value of each signal and the composite envelope value.

The operation of the automatic tracking control system shown in and according to the embodiment of FIG. 11 will now be described.

A frequency generator signal of, for example, 720 Hz outputted from the drum frequency generator 10a coupled to the drum drive motor 8, and an output signal from the down-shift counter 30c which counts down the 3.58 MHz reference oscillator signal are compared with each other by the drum frequency comparator 31b. A drum PG pulse signal of 30 Hz representative of the phase of rotation of the magnetic heads which is detected by the drum phase detecting head 19 in cooperation with the magnet piece 18 secured to the rotary drum 6 is supplied to the drum flip-flop circuit 31c to provide therefrom an output of a waveform, shown by (A) in FIG. 12, which is subsequently compared by the drum phase comparator 31a (See the waveform (B) in FIG. 12) with an output signal from the down-shift counter phase correcting circuit 30b. The output signal from the phase correcting circuit 30b is the 3.58 MHz reference oscillator signal which has been counted down and subsequently corrected in phase. Respective output signals from the drum frequency comparator 31b and the drum phase comparator 31a are mixed together and filtered to be smooth by the mixing filter 31d, and a mixed and smooth output signal from the mixing filter 31d is subsequently applied to the drum drive motor control circuit 7 to control both the phase and the speed of rotation of the drum 6 so that the latter can be driven at 1,800 rpm about the axis of rotation thereof.

On the other hand, a frequency generator signal of, for example, 720 Hz outputted from the capstan frequency generator 10 coupled to the capstan drive motor 9, and the 3.58 MHz reference oscillator signal which has been counted down by the down-shift counter 30d, that is, the output signal from the down-shift counter 30d, are compared by the CP frequency comparator 32b with each other. The control signal of a waveform shown by (G) in FIG. 12, which has been detected by the stationary control head 5 and subsequently amplified by the control signal amplifier 16, and the tracking control signal of a waveform shown by (E) in FIG. 12 which has been synthesized by the microcomputer 45 are compared by the CP phase comparator 32a with each other. Respective output signals from the CP frequency comparator 32b and the CP phase comparator 32a are then mixed together and are filtered smooth by the mixing filter 32c, and a mixed and smooth output from the mixing filter 32c is subsequently applied to the capstan motor drive circuit 11 to control the speed and phase of rotation of the capstan 14 so that the length of magnetic tape 1 can be transported at the predetermined speed in a stabilized manner.

An output signal of a waveform shown by (A) in FIG. 12 emerging from the drum flip-flop circuit 31c is supplied as the rotary video head switching signal to the video head amplifier 41a to switch over between respective inputs from the video heads 4a and 4b. A flip-flop signal which corresponds to the Hi-Fi audio heads 40a and 40b secured to the rotary drum 6 and spaced 90° relative to the adjacent video heads 4a and 4b with respect to the axis of rotation of the rotary drum 6 and which has been delayed and therefore has a waveform shown by (C) in FIG. 12 is supplied to the Hi-Fi audio head amplifier 41b to switch over between respective inputs from the audio heads 40a and 40b. In this manner, the video signal and the Hi-Fi signal which are amplified respectively by the video head amplifier 41a and the audio head amplifier 41b are switched over to provide respective continuous envelope signals.

The frequency-modulated video signal amplified by the video head amplifier 41a is detected by the video signal envelope detector 42a, and the detected analog envelope signal is subsequently converted by the analog-to-digital converter 43a into the digital signal LV which is then stored in the memory circuit 44a. Similarly, the frequency-modulated audio signal amplified by the Hi-Fi audio head amplifier 41b is detected by the audio signal envelope detector 42b, and the detected analog envelope signal is subsequently conveted by the analog-to-digital converter 43b into the digital signal LA which is then stored in the memory circuit 44b. Each of the analog-to-digital converters 43a and 43b may be of a type operable on a 8-bit basis (256 stages) at a sampling frequency of 10 KHz and can therefore be fabricated at inexpensive cost.

Respective voltage outputs from the memory circuits 44a and 44b are summed together by an adder 45a included in the microcomputer 45. The microcomputer 45 also includes an arithmetic unit 45b and a tracking control signal generator 45c which operate to provide the tracking control signal of a waveform shown by (E) in FIG. 12 in reference to the ½ frequency divided vertical reference signal of 30 Hz synthesized by the ½ frequency divided vertical signal generator 34 and having a waveform shown by (D) in FIG. 12. The ½ frequency divided vertical reference signal is in turn supplied to the CP phase comparator 32a at which the phase is compared with the control pulse signal of a waveform shown by (G) in FIG. 12. A waveform shown by (F) in FIG. 12 represents that of a signal output the CP phase comparator 32a.

The manner in which the tracking control signal is synthesized in the microcomputer 45 will now be described.

Respective envelope digital values LV and LA of the video and Hi-Fi audio signals supplied from the memory circuits 44a and 44b are inputted to the microcomputer 45. These envelope digital values LV and LA are summed together by the adder 45a. The arithmetic unit 45b is operable to perform the following calculation with respect to the sum L of those envelope digital values LV and LA. FIG. 14 illustrates an output characteristic of the composite envelope value during a normal mode.

At step S1, the search starting point of the search is assumed to be at $t_0$ and the composite envelope value at such search point $t_0$ is assumed to be $L_0$. An appropriately chosen value p is substracted from the composite envelope value $L_0$ and, then, at atep S2, the difference is compared with the initially set determining value $J_{00}$. In the illustrated example, since the value $J_{00}$ is chosen to be $J_{00} < < L_0$, the value $J_{00}$ is therefore smaller than the difference between the composite envelope value $L_0$ less the value p.

Then, at step S3, a discriminating value j is updated to be $j_0 = L_0 - p$ and the tracking phase is changed by $\Delta t$ in a negative direction to give the composite envelope value $L_{-1}$ at the search point $t_{-1}$, and at step S2, the comparison is made between the difference $L_{-1} - p$ and a discriminating value $j_0$. If the result indicates that the difference $L_{-1} - p$ is smaller than the value $J_0$, that is, the difference $L_0 - p$, the search point is changed by $\Delta t$ in the negative direction to determine the composite envelope value $L_{-2}$ at the search point $t_{-2}$ which is similarly compared with the discriminating value $j_0$. If the result of comparison indicates that the difference $L_{-2} - p$ is smaller than the value $j_0$ or the difference $L_{-3} - p$ is smaller than the value $j_0$ for the subsequent step, the discriminating value $J_0$ is temporarily stored in a random access memory (RAM). It is to be noted that in the illustrated example three steps are employed.

Then, it is determined that no maximum value of the composite envelope value L is available even if the search is made in this negative direction and, at step S5, the point A at which $L_a$ becomes equal to the value $j_0$, followed by step S6 at which the tracking phase (designated $t_a$ in the illustrated example at the point A) is stored in a random access memory RAM in the microcomputer 45.

Thereafter, the direction in which the search is made is reversed and the program flow return to step S1 to determine the composite envelope value $L_{-2}$ at the search point $t_{-2}$ to which the tracking phase has been changed by $\Delta t$ in a positive direction. At subsequent step S2, the determining value is updated to $L_{-3} - p = j_{-3}$ and compared. If the result of comparison indicates that the difference $L_{-2} - p$ is equal to or greater than $j_{-3}$, the tracking phase is further changed by $\Delta t$ in the positive direction to determine the composite envelope value $L_{-1}$ at the search point $t_{-1}$, and at step S3 the determining value is updated to $j_{-2} = L_{-2} - p$ and compared. This cycle of operation is repeated as shown by the following equations.

$$L_{-1} - p \geq j_{-2} = L_{-2} - p$$
$$L_{-0} - p \geq j_{-1} = L_{-1} - p$$
$$L_1 - p \geq j_0 = L_0 - p$$
$$\vdots \quad \vdots \quad \vdots$$
$$\vdots \quad \vdots \quad \vdots$$

When the composite envelope value L attains a value $L_{10}$ at which it starts decreasing, the result of comparison will indicate as follows.

$$L_{10-p} < p = L_9 - p$$

In this way, the tracking phase is sequentially searched in the positive direction, and the difference $L_i - p$ of the composite envelope value $L_i$ at each search point less the predetermined value p is then compared with the discriminating value $j_i$ which is the difference $L_{i-1} - p$ of the previous composite envelope value $L_{i-1}$ less the predetermined value p. This process is repeated if the result of comparison indicates that the composite envelope value $L_i$ is equal to or higher than the discriminating value $j_i$. However, when the result of comparison indicates that the composite envelope value $L_i$ is lower than the discriminating value $j_i$, the discriminating value $j_i$ ($j_9$ in this instance) is stored in the random access memory in the microcomputer 45. Subsequently, the search is conducted while the tracking phase is changed by $\Delta t$ in the positive direction, and, at step S5, the point B at which the composite envelope L attains a value equal to the discriminating value $j_9$, followed by step S7 at which the tracking phase $t_b$ at the point B is stored in the random access memory in the microcomputer 45.

By the above described calculation, the setting operation for the points A and B is completed. Thereafter, the tracking phase at a point C intermediate the points A and B is set to a reference tracking phase $t_s$ and thereafter the search is again conducted in the negative direction from the point B, which search is terminated at the point C. In reference to this reference tracking phase $t_s$, the tracking control signal of the waveform shown by (E) in FIG. 12 is synthesized by the tracking control signal generator 45c in the microcomputer 45 and is then supplied to the CP phase comparator 32a.

The foregoing operation necessarily takes place simultaneously with the start of reproduction performed by the magnetic tape player, however, it may be repeated in the event that, during the reproducing mode being performed, the composite envelope value $L_i$ attains a value lower than the discriminating value $j_i$.

Figure 15A:
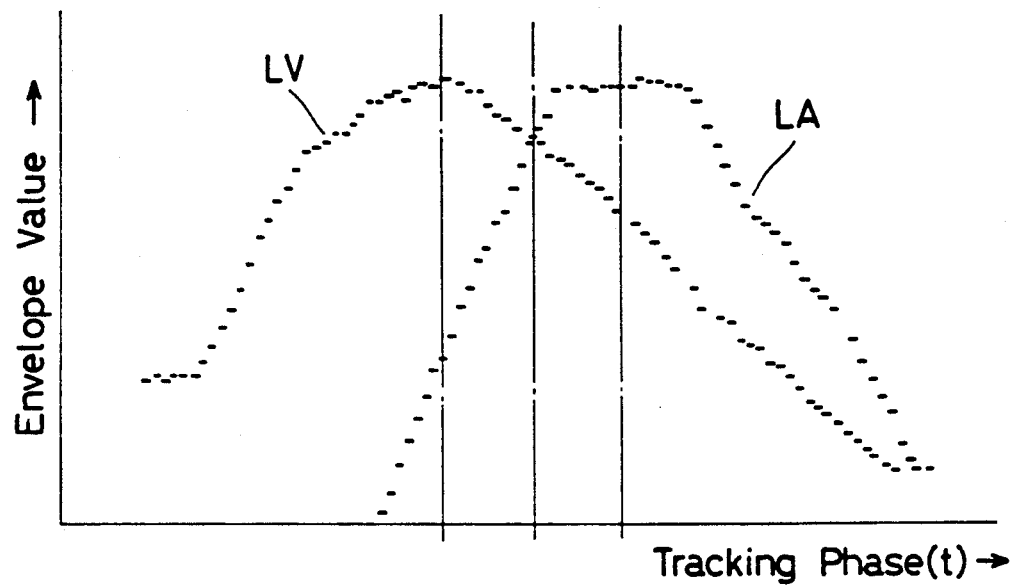
FIGS. 15(a) and 15(b) are diagrams used to explain the tracking characteristic of the system of FIG. 11.
Figure 15B:
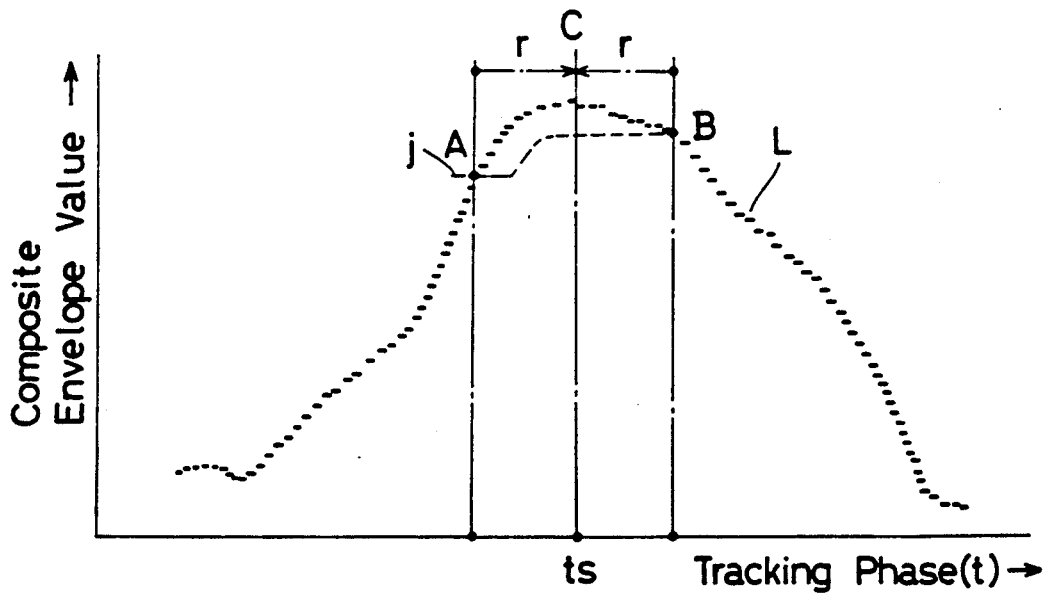

FIG. 15 illustrates a diagram showing the tracking characteristic, wherein FIG. 15(a) illustrates the characteristic of the envelope value LV of the video signal and the envelope value LA of the Hi-Fi audio signal relative to the tracking phase and FIG. 15(b) illustrates the characteristic of the composite envelope value L relative to the tracking phase. As can be understood from FIG. 15, when the control is made to the tracking phase at which the composite envelope value L attains the maximum value, the optimum tracking can be accomplished as a whole with respect to both of the video signal and the Hi-Fi audio signal, and the reference tracking phase $t_s$ determined in the above described manner in this embodiment of the present invention approximates to the optimum tracking phase.

The concept of the present invention hereinabove described as applied to the magnetic tape player having double-level recording capability can be equally applicable to the magnetic tape player having triple-level recording capability. The embodiment in which the present invention is applied to the magnetic tape player having triple-level recording capability will now be described with particular reference to FIG. 16.

Figure 16:
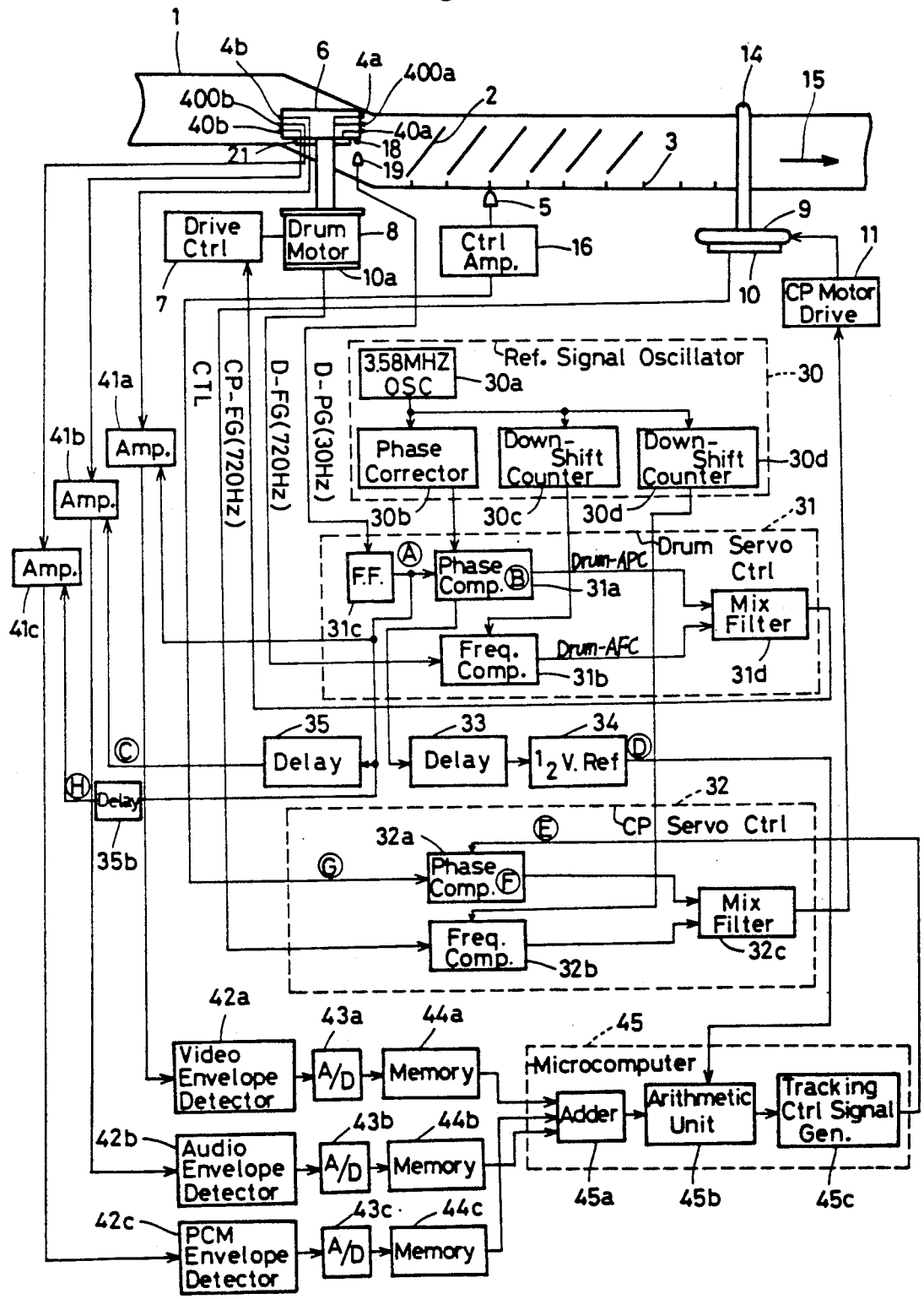
FIG. 16 is a block circuit diagram showing the automatic tracking control system according to a second preferred embodiment of the present invention which is suited for use in association with the triple-level recording system.

While parts alike those parts shown in FIG. 11 are designated by like reference numerals employed in FIG. 16, reference numeral 35 represents a delay circuit for synthesizing a head switching signal for a PCM recording and/or reproducing head 400 which is the drum flip-flop signal having been delayed. Reference numeral 41c represents a PCM signal head amplifier; reference numeral 42c represents a PCM signal envelope detecting circuit; reference numeral 43c represents an analog-to-digital converter; and reference numeral 44c represents a memory circuit.

In this second preferred embodiment, in the memory circuits 44a, 44b and 44c, the envelope values LV, LA and LP which are weighted in a ratio of x:y:z are inputted to the adder 45a so that those envelope values can be summed together to give the composite envelope value L, the operation of the arithmetic unit 45b in the microcomputer 45 to set the reference tracking phase and the subsequent tracking control operation are substantially similar to those described in connection with the foregoing embodiment.

Figure 17A:
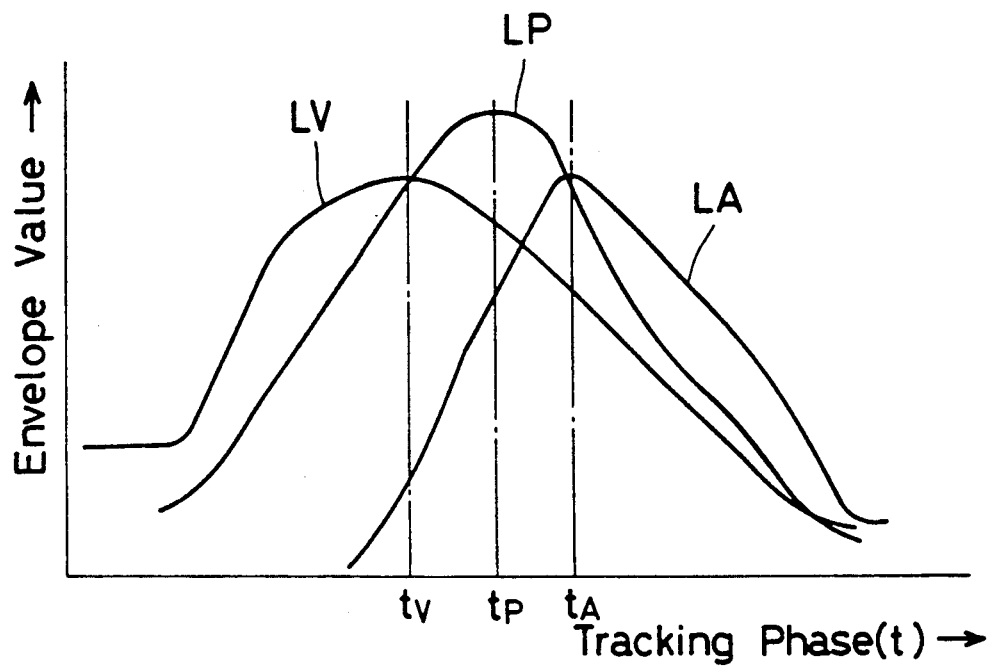
FIGS. 17(a) and 17(b) are diagrams showing a waveform of the envelope value, which diagrams are used to explain the operation of the system shown in FIG. 16.
Figure 17B:
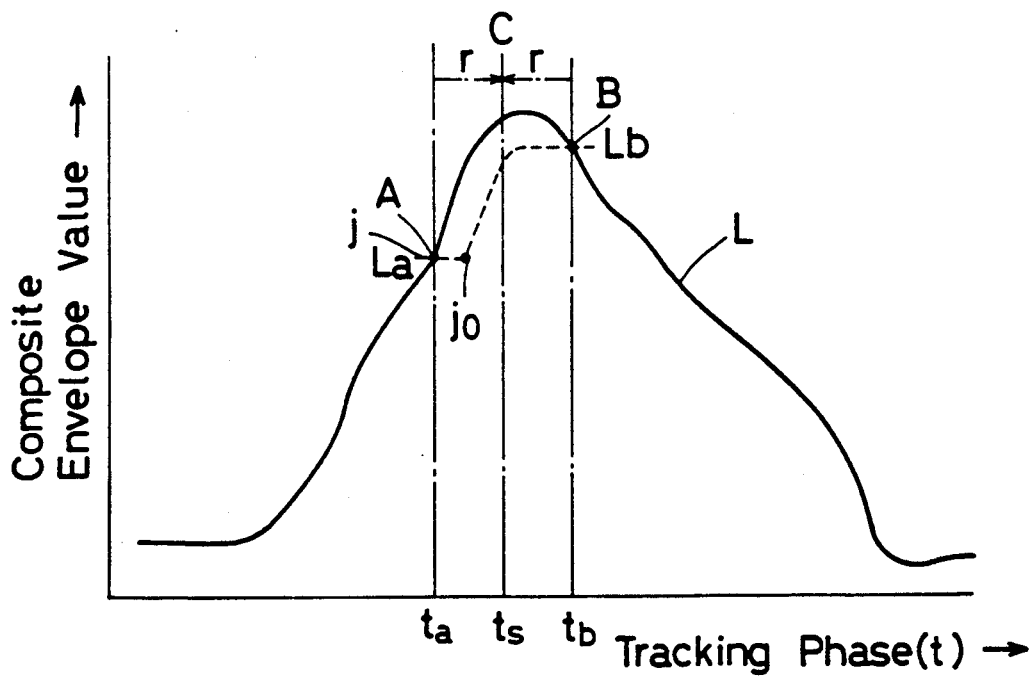

FIG. 17 illustrates a diagram showing the tracking characteristic of the respective envelope values LV, LA and LP of the video, audio and PCM signals and the composite envelope value L, formed by adding those envelope values in a proportion of 1:1:1, relative to the tracking phase. As shown in FIG. 17(b), the reference tracking phase $t_s$ determined in this second preferred embodiment of the present invention approximates to the optimum tracking phase.

Hereinafter, a third preferred embodiment of the present invention will be described with particular reference to FIG. 18. It is, however, to be noted that in the third embodiment a weight is placed on the tracking of the Hi-Fi audio signal and that FIG. 18 illustrates only a portion of the circuitry of the automatic tracking control system which differs from that shown in FIG. 11.

Figure 18:
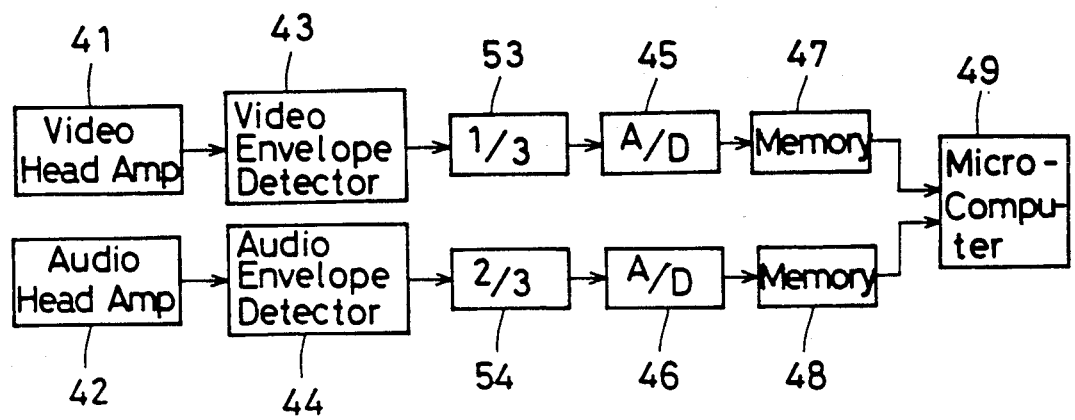
FIG. 18 is a block circuit diagram showing a portion of the embodiment in which the envelope detected voltages are weighted.

Referring now to FIG. 18, reference numeral 53 represents a ⅓ attenuator for attenuating the level of the video envelope detected signal, inputted thereto, to a level equal to one third of the original level, and reference numeral 54 represents a ⅔ attenuator for attenuating the level of the Hi-Fi audio envelope detected signal to a level equal to two thirds of the original level.

Except that the operation of the various component parts of the automatic tracking control system according to the third preferred embodiment of the present invention is weighted by the attenuators 53 and 54, it is substantially similar to that described in connection with the first preferred embodiment of the present invention and is not, therefore, reiterated for the sake of brevity.

Figure 19A:
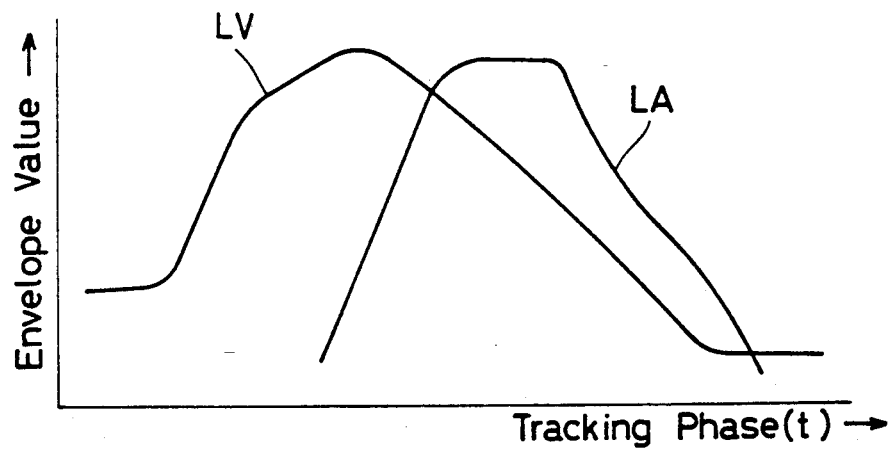
FIGS. 19(a) and 19(b) are diagrams showing a waveform of the envelope value, which diagrams are used to explain the operation of the system of FIG. 18.
Figure 19B:
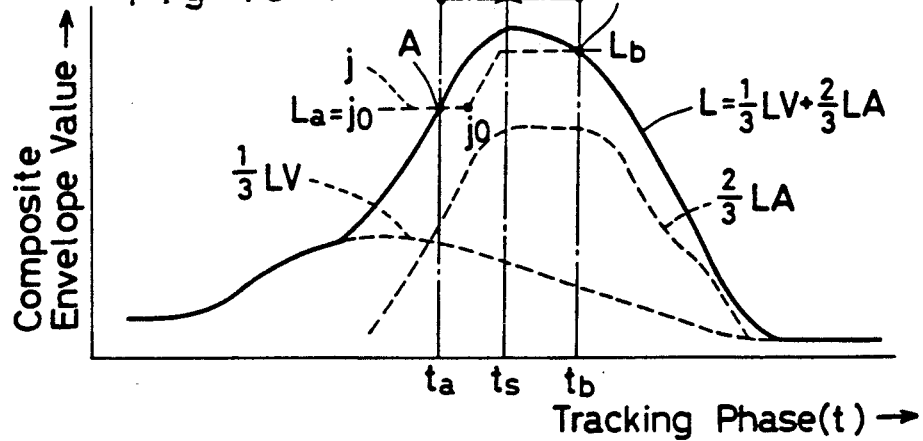

However, FIG. 19 illustrates a diagram used to explain the tracking characteristic according to the third embodiment of the present invention, wherein FIG. 19(a) shows the characteristic of the envelope value LV of the video signal and the envelope value LA of the Hi-Fi audio signal, which are not weighted, relative to the tracking phase and FIG. 19(b) shows the characteristic of the respective envelope values ⅓LV and ⅔LA of the video and Hi-Fi audio signals, which have been weighted by the associated attenuators 53 and 54, and the composite envelope value L relative to the tracking phase. According to the embodiment of FIG. 18, the envelope value LA of the Hi-Fi audio signal recorded on the inner stratum of the length of magnetic tape 1 and the envelope value LV of the video signal recorded on the outer stratum of the same length of magnetic tape are so chosen to be weighted in a proportion of 2:1 and, accordingly, the characteristic is such that the envelope value LA of the Hi-Fi audio signal is weighted more than the envelope value LV of the video signal. In this embodiment of FIG. 18, if the point C is determined in a manner similar to that described in connection with the first embodiment of the present invention (FIG. 11) and the control is carried out using the tracking phase $t_s$ as the reference tracking phase, the optimum tracking control can be accomplished as a whole with respect to the Hi-Fi audio signal as well as the video signal.

As hereinabove described, when the tracking control in which the envelope value LA of the Hi-Fi audio signal recorded at a narrow track width on the inner stratum of the length of magnetic tape is weighted, it is possible to set the reference tracking phase $t_s$ of high signal-to-noise ratio in respect of both signals including not only the Hi-Fi audio signal, but also the video signal recorded at a relatively large track width on the outer stratum of the same length of magnetic tape.

It is to be noted that, in the magnetic tape player having triple-level recording capability shown in FIG. 16, the tracking control wherein a weight is placed on a desired reproduced signal can be similarly accomplished if the weighting ratio x:y:z is suitably varied.

Figure 20:
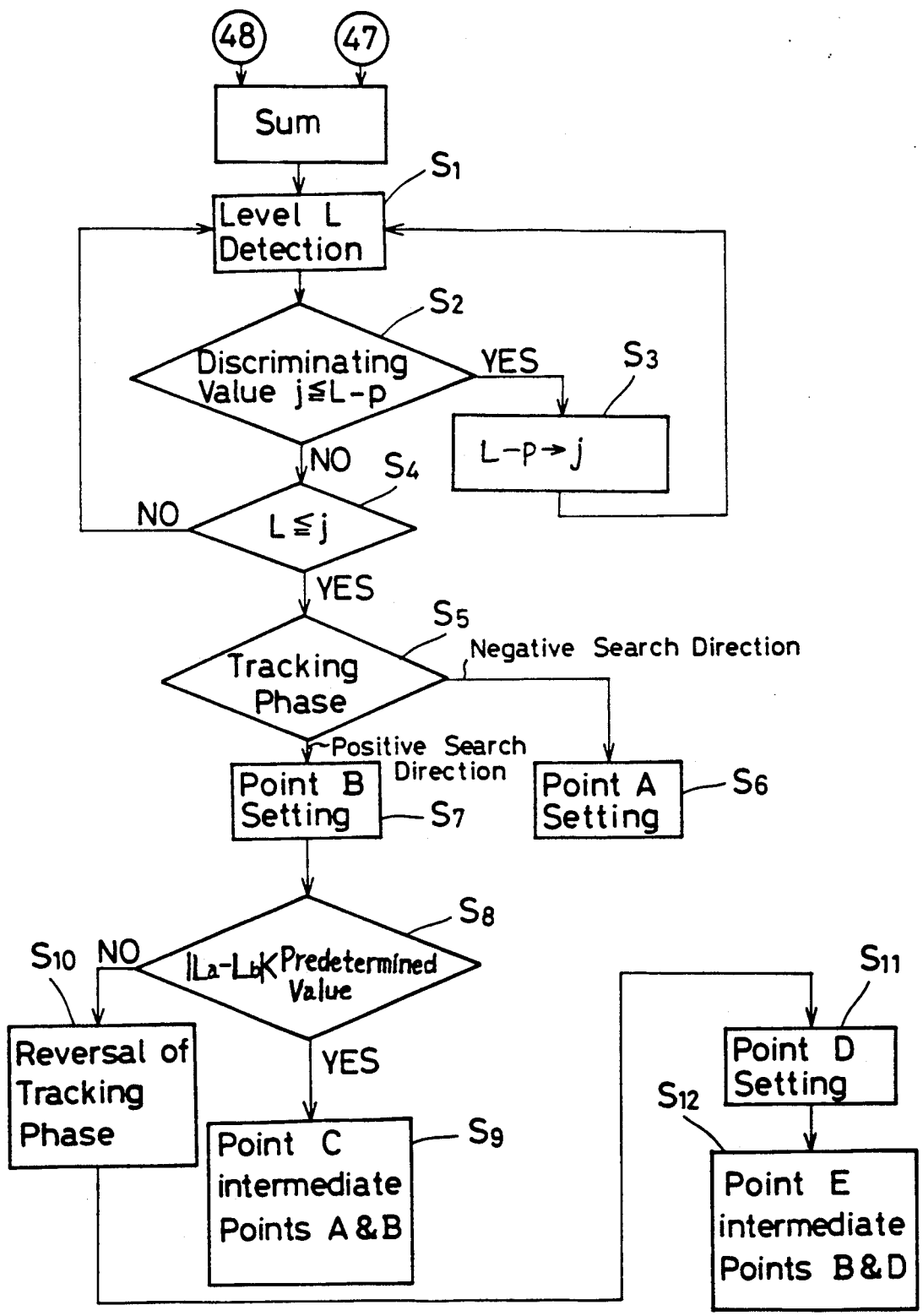
FIG. 20 is a flowchart showing the sequence of operation of a reference tracking phase setting means which is different from that shown in FIG. 13.

FIG. 20 is a flowchart showing another reference tracking phase setting means in the arithmetic unit 45b shown in FIG. 11. The reference tracking phase setting means is effective to accomplish the favorable tracking control particularly where the composite envelope value L exhibits a steep peak characteristic.

Figure 21A:
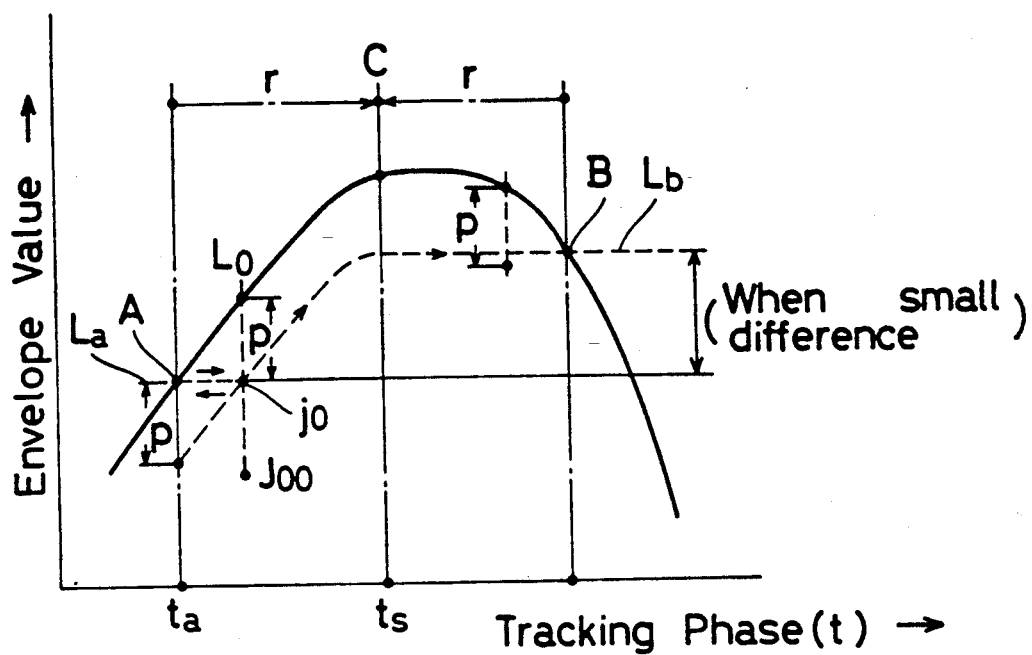
FIGS. 21(a) and 21(b) are diagrams showing a waveform of the envelope value, which diagrams are used to explain the operation thereof.

Referring now to FIG. 20, by the calculating operation from step S1 to step S7, the respective tracking phases La and Lb at the points A and B are determined and stored in the random access memory as in the case with the previous embodiment described with reference to FIG. 13. However, at step S8, the difference between the composite envelope values La and Lb is determined, and, if this difference is smaller than a predetermined value (that is, the difference between the envelope values La and Lb is small), at step S9 the point C intermediate the points A and B is, as shown in FIG. 21(a), set as the tracking phase $t_s$.

Figure 21B:
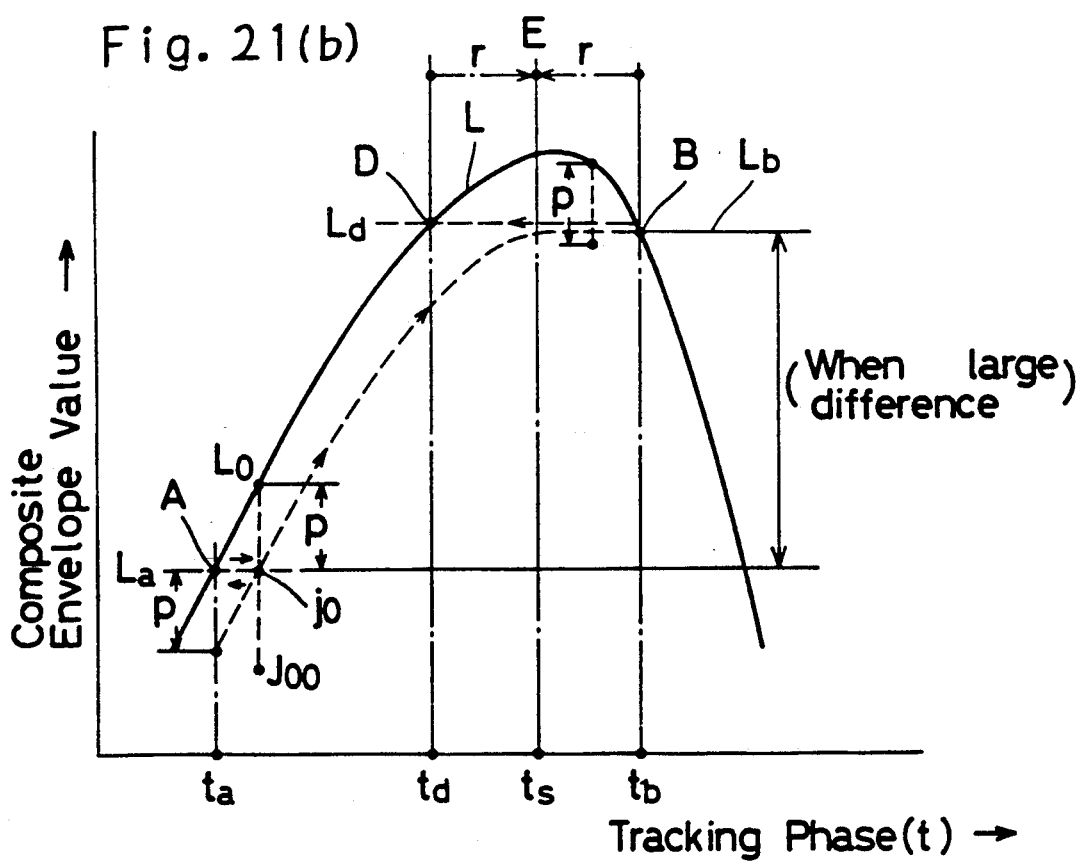

Conversely, as shown in FIG. 21(b) where the difference between the envelope values La and Lb is greater than a predetermined value (such as occurring when the response of the composite envelope $L_i$ exhibits a steep peak characteristic which is exhibited particularly when the recording is made with the use of the magnetic tape player using the video and Hi-Fi audio recording and/or reproducing heads of relatively narrow width and the reproduction is made with the use of the different magnetic tape player using the video and Hi-Fi audio recording and/or reproducing heads of relatively large width), at step S10 the direction of search is reversed in search for the point D at which Ld attains the same level as the envelope value Lb, which tracking phase is stored in the random access memory at step S11. Subsequently, the tracking phase at a point E intermediate the points D and B is set as the reference tracking phase.

By so doing, in the case of borrowed-recording and borrowed-reproduction, optimum tracking control can be accomplished according to the difference in composite envelope value L resulting from the difference in structure between the magnetic tape player used for the recording and that for the reproduction.

Figure 22:
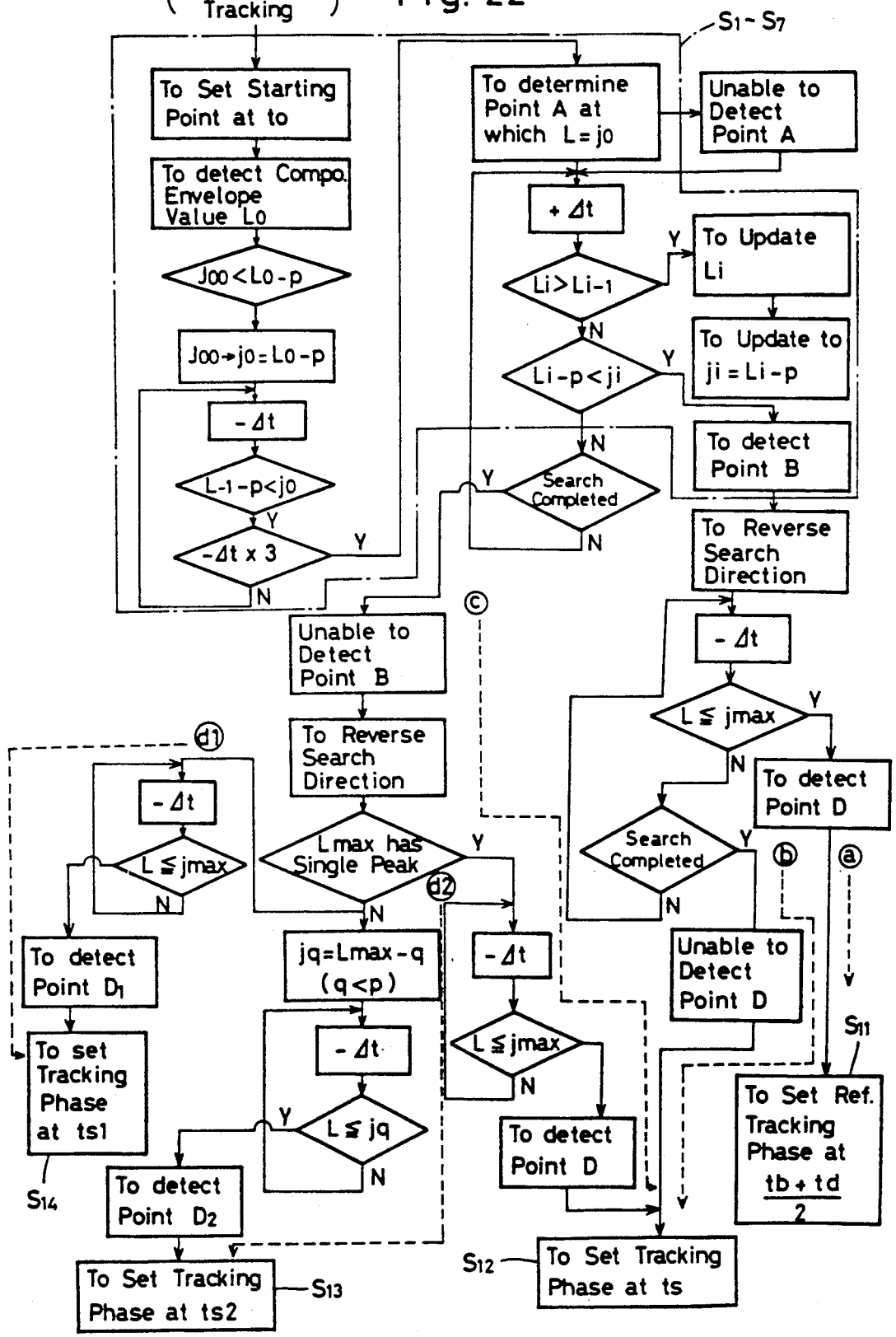
FIG. 22 is a flowchart showing the different sequence of operation of the reference tracking phase setting means.

FIG. 22 illustrates the flowchart showing another reference tracking phase setting means in the arithmetic unit 45b shown in FIG. 11. The reference tracking phase setting means is effective to accomplish favorable tracking control particularly where the composite envelope value L exhibits a twin-peak characteristic, or where the composite envelope value L exhibit a peak characteristic so moderate that either the point A or the point B cannot be detected.

The case with the twin-peak characteristic will first be described with particular reference to FIG. 23(a).

In the flowchart shown in FIG. 22, an area of S1 to S7 bound by the single-dotted line is similar to the flowchart shown in and described with reference to FIG. 13 and, when the composite envelope value L attains a value $L_2$ from which it starts decreasing, the following relationship is established as in the case with the flowchart of FIG. 13.

$$L_2 - p \leq j_1 = L_1 - p$$

Thereafter, the tracking phase is searched each $\Delta t$ in the positive direction, and, when the composite envelope value L starts increasing again to establish the relationship of $L_i - p > j_i$, the comparison is sequentially repeated while the discriminating value j is updated so that the maximum value Lmax is eventually stored. When the composite envelope value L starts decreasing to establish the relationship of $L_i - p < j_{max}$, the discriminating value $j_{max}$ is temporarily stored in the random access memory in the microcomputer 45. Further, the tracking phase is searched each $\Delta t$ in the positive direction to determine the point B at which the composite envelope value L attains a value equal to $j_{max}$. The tracking phase $t_b$ at this point B is then stored in the random access memory in the computer 45. The process so far described is substantially similar to the flowchart shown in and described with reference to FIG. 13.

Thereafter, the direction of search is reversed to decrease the tracking phase by $\Delta t$ so that the point D at which the envelope value L attains a value equal to $j_{max}$ and the tracking phase $t_d$ at this point D is stored in the random access memory.

By the above described calculating operation, the tracking points B and D are detected and are then stored in the random access memory. Subsequently and at step S11, the tracking phase at a point E intermediate between the points B and D, that is, $(t_b + t_d)/2$, is set as the reference tracking phase $t_s$. This is substantially similar to the setting operation shown in FIG. 21(b).

Figure 23A:
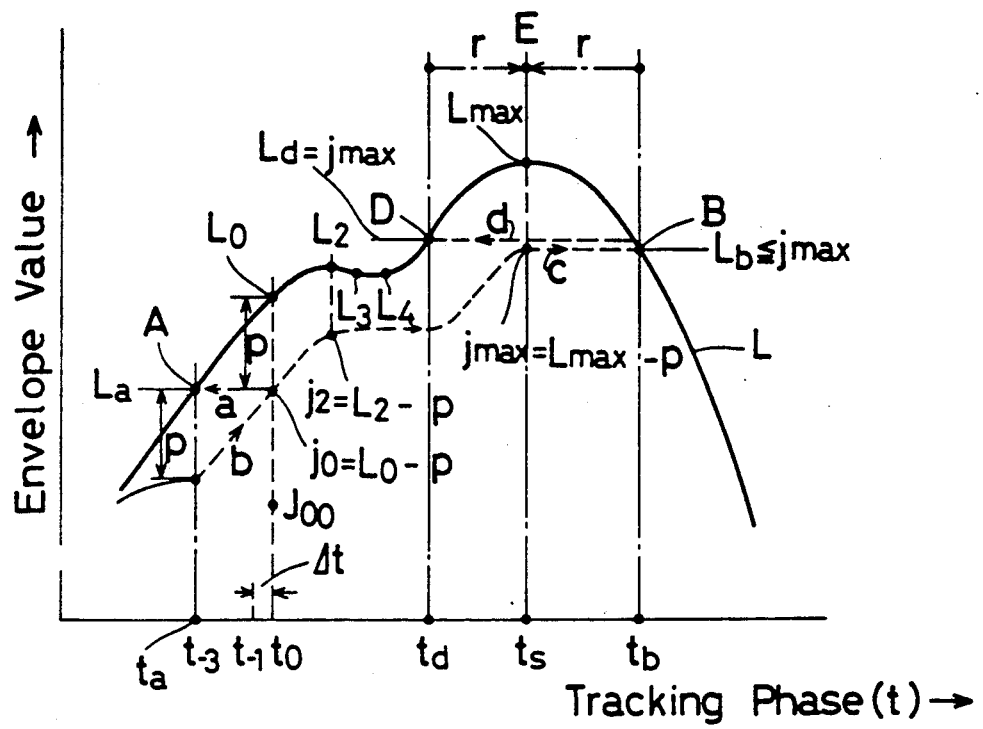
FIGS. 23(a) to 23(d) are diagrams showing a waveform of the envelope value, which diagrams are used to explain the operation shown in FIG. 22.
Figure 23B:
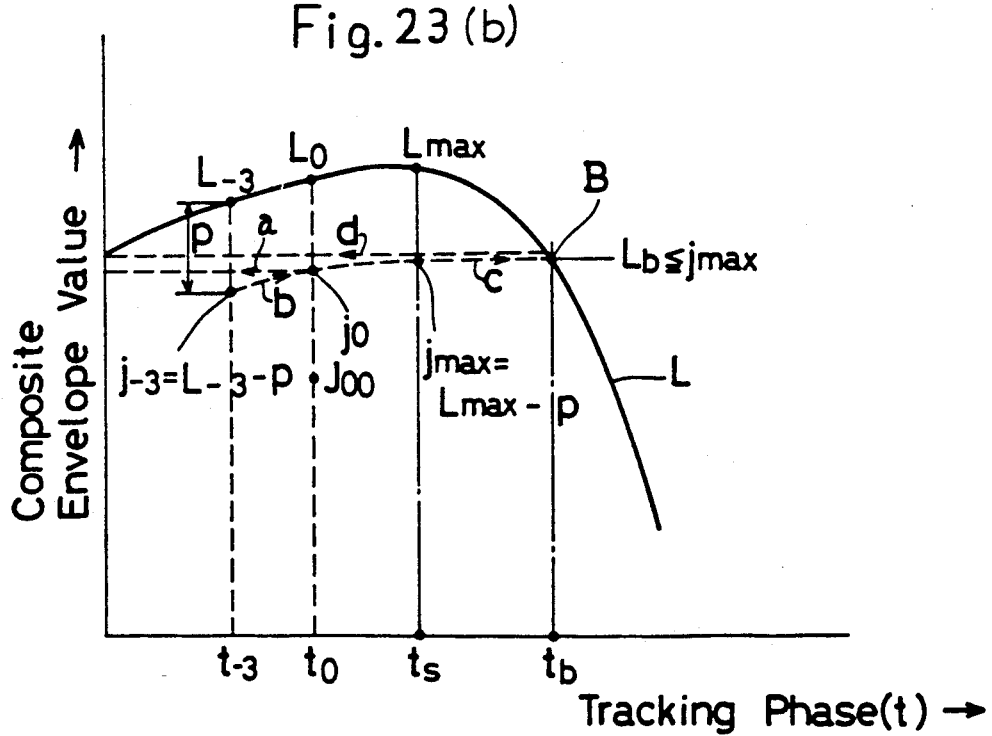

As hereinbefore described, where the composite envelope value during the normal mode exhibits the twin-peak characteristic as shown in FIG. 23(a), the composite envelope value $L_2$ during the search being performed attains a maximum point, however, $L_2$ during the subsequent search will not attain the maximum value because neither $L_3$ or $L_4$ is greater than $j_2$, the search being continued to determine the maximum point Lmax.

Where as shown in FIG. 23(b) the composite envelope value exhibits a single peak characteristic and, although the point at which the maximum value Lmax is attained and the composite envelope value L is equal to or smaller than $j_{max}$ can be detected, neither the point A nor the point D can be detected as shown in FIG. 23(a), the tracking phase at the point Lmax is set at step S12 as the reference tracking phase $t_s$ after the program flow has proceeded through the flow shown by b.

Figure 23C:
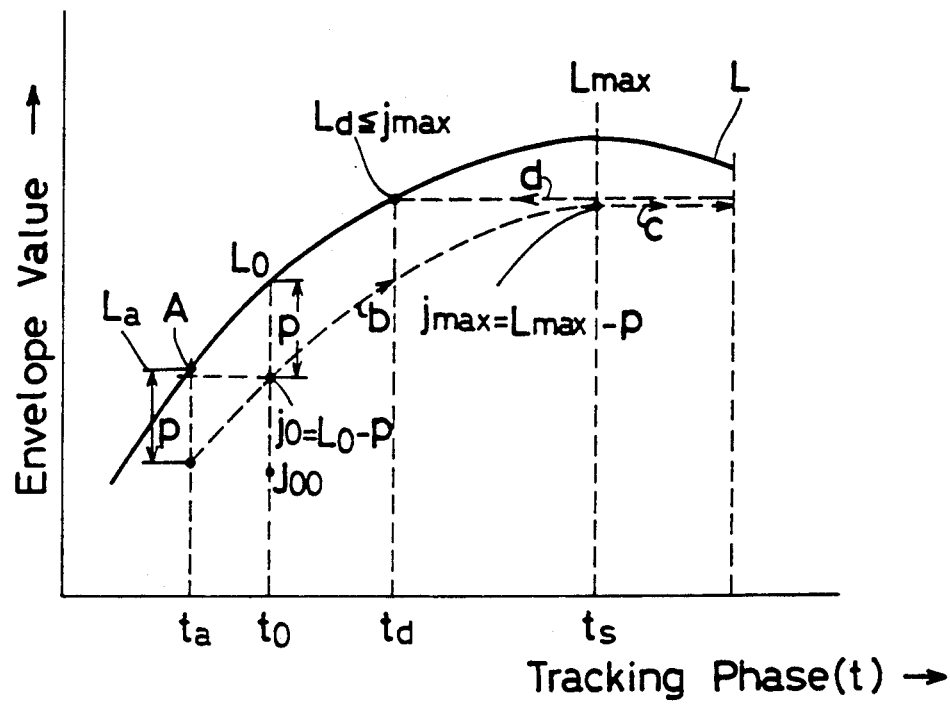

On the other hand, where as shown in FIG. 23(c) the composite envelope value exhibits a single peak characteristic and, although the maximum value Lmax and the point D shown in FIG. 23(a) can be detected, the point B at which the composite envelope value L attains a value equal to or smaller than $j_{max}$ cannot be detected, the tracking phase at the point showing Lmax is set at step S12 as the reference tracking phase $t_s$ after the program flow has proceeded thorough the flow shown by c.

Figure 23D:
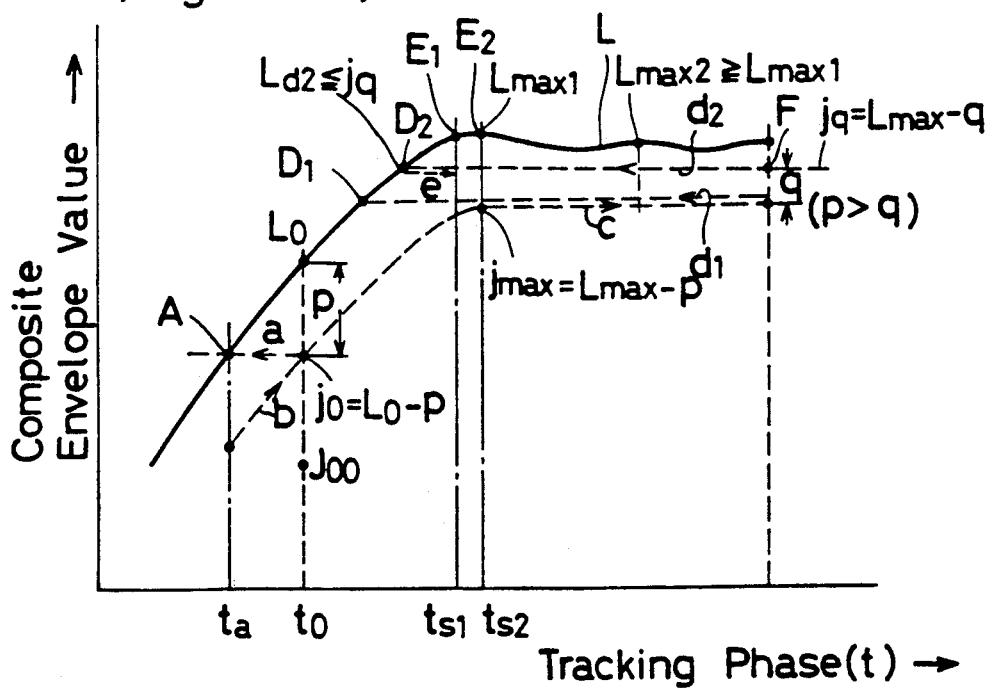

The setting of the reference tracking phase applicable when the magnetic tape player is switched in a x3 mode shown in FIG. 23(d) (the mode in which the length of magnetic tape is transported at a speed one third of that during the normal mode for a long recording or a long reproduction) will now be described.

In general during the x3 mode, since each of the video heads used a head gap of 31 to 33 micrometers and each of the Hi-Fi audio heads used has a head gap of 26 to 27 micrometers relative to the track width of 19 micrometers, the characteristic curve exhibited by the composite envelope value exhibits a flat curve having a plurality of peaks and it is necessary to make a search over the entire search area in order for the search point, at which $L_i$ attains a value equal to or smaller than $j_{max}$, to be detected. However, it often occurs that, even though the search is made over the entire search area, the search point at which $L_i$ attains a value equal to or smaller than $j_{max}$ cannot be detected. Even though it is successfully detected, and where a plurality of peak points are detected such as shown in the characteristic of FIG. 23(d), the setting of the tracking phase at the search point of Lmax2 as the reference tracking phase $t_s$ tends to result in that the tracking phase is displaced rightward with respect to the tracking phase at which the optimum result can be obtained as a whole with the consequence that cross-talk often occurs from the next adjacent track. One method of substantially alleviating this problem is that at a search terminating point F (right end) the direction of search is reversed to detect a search point D1 at which, as shown in the flow d1, $L_{d1}$ attains a value equal to or smaller than $j_{max}$ and the tracking phase is set at step S14 as the reference tracking phase ts1 at a detected search point E1 closest to the search point D1 and at which the maximum value Lmax1 is first attained.

An alternative method is that, as shown by the flow d2, when the direction of search is reversed, the discriminating value $j = Lmax - P$ is updated to $jq = Lmax - q(q < p)$, that is $jq > j_{max}$ and the direction of search is then reversed to detect a point D2 at which $L_i$ attains a value equal to or smaller than jq. When and after the point D2 has been detected, the tracking phase at a point $E_2$ a few millisecond preceding from the point D2 is set as the reference tracking phase $t_{s2}$.

In either method, the tracking control system according to this embodiment is effective to accomplish the optimum tracking for x3 modes without cross-talk.

It is to be noted that, although in this embodiment the value p to be subtracted from the maximum value and the value q for the time limiting are separately considered, the both may be an equal value.

Also, in describing any one of the foregoing embodiments of the present invention, the drum servo system and the capstan servo system may be of any construction generally known as a digital servo circuit. However, the present invention is not limited thereto and can be applicable to the use of an analog servo circuit.

Furthermore, since the Hi-Fi audio reproduced signal becomes zero when a non-Hi-Fi video tape is loaded in a magnetic tape player, the system of the present invention itself can be utilized provided that the envelope value of the video reproduced signal is switched to be doubled.

In addition, the analog-to-digital converters 43a and 43b, the bit number of the microcomputer 45 and the sampling frequency can be arbitrarily chosen, however, a series of experiments have shown that a sufficient performance can be obtained with a 8-bit microcomputer at 4 MHz.

As hereinbefore fully described, the present invention provides an automatic tracking control system for use in a magnetic tape player of a type having plural level recording capability such as double-level or triple-level recording capability, which system comprises a servo control means for controlling a tracking phase of a rotary head assembly, a search control means for causing the servo control means to vary the tracking phase in a predetermined quantity thereby to make a search so as to reciprocate within a predetermined tracking phase area, a detecting means for detecting envelope voltage values of an audio signal and a video signal reproduced for each search point and summing such signals together to provide a composite envelope value, and a reference tracking phase setting means for detecting the tracking phase, at which an optimum tracking can be attained when the reproduced signals are integrated from the composite envelope value, thereby to set a reference tracking phase which provides a reference value to the servo control means. Accordingly, even in the case of borrowed-recording and borrowed-reproduction or in the case where the magnetic tape is reproduced with the use of a magnetic tape player having only reproducing capability wherein the magnetic reproducing heads are of relatively large head gap so that special functions such as still reproduction, slow-motion reproduction and others are emphasized, the substantially precise tracking can be accomplished with the automatic tracking control system of the present invention.

Although the present invention has fully been described in connection with the preferred embodiments thereof with reference to the accompanying drawings used only for the purpose of illustration, those skilled in the art will readily conceive numerous changes and modifications within the framework of obviousness upon reading of the specification herein presented of the present invention. Accordingly, such changes and modifications are, unless they depart from the spirit and scope of the present invention as delivered from the claims annexed hereto, to be construed as included therein.

What is claimed is:

1. An automatic tracking control system for use in a magnetic recording and/or reproducing apparatus of a type having plural level recording capability wherein an audio signal is recorded on an inner stratum of a length of magnetic recording medium and a video signal is recorded on an outer stratum of the same length of magnetic recording medium at a track width different from that for the audio signal, which system comprises:
    servo control means for controlling a tracking phase of a rotary head assembly;
    search control means for causing said servo control means to vary said tracking phase by a predetermined quantity thereby to make a search so as to scan in a first direction and a second direction within a predetermined tracking phase area;
    detecting means for detecting envelope voltage values of the audio signal and the video signal reproduced for each search point, and for summing said detected envelope voltage values together to provide a composite envelope value; and
    reference tracking phase setting means for detecting a tracking phase, at which an optimum tracking can be attained when reproduced signals are integrated from said composite envelope value, thereby to set a reference tracking phase which provides a reference value to said servo control means.

2. The automatic tracking control system as claimed in claim 1, wherein said detecting means, when said detected envelope voltage values of each of said reproduced signals are summed together, weights said detected envelope voltage values before they are summed together.

3. The automatic tracking control system as claimed in claim 1, wherein said reference tracking phase setting means is operable to
    conduct a search in said first direction, while said composite envelope value is compared with a discriminating value fixed at a predetermined value, to detect a first search point at which said composite envelope value attains a value equal to or smaller than said discriminating value;
    conduct a search in said second direction opposite to said first direction, while said composite envelope value detected for each search point is compared at each search point with said discriminating value which is updated to a value equal to said composite envelope value, which is detected after said search in said second direction has been initiated, less a predetermined value; and
    continue said search in said second direction to detect a second search point at which said composite envelope value attains a value smaller than said discriminating value, an average value of said tracking phases at said second search point and said first search point being set as said reference tracking phase.

4. The automatic tracking control system as claimed in claim 3, wherein said reference tracking phase setting means includes comparing means for detecting the difference between said composite envelope value at said first search point and said composite envelope value at said second search point and for comparing such difference with a predetermined value, said reference tracking phase setting means operable
    to set an intermediate value, which is obtained by dividing said difference between the tracking phases at said first and second search points in a predetermined proportion, as said reference tracking phase in the event that such difference is smaller than said predetermined value, and
    in the event that said difference is greater than said predetermined value, to conduct a search, after the direction of search has been reversed starting from said second search point, to detect a third search point at which said composite envelope value attains a value smaller than said discriminating value at said second search point and to set an average value of the respective tracking phases at said third and second search points as said reference tracking phase.

5. The automatic tracking control system as claimed in claim 4, wherein said reference tracking phase setting means is operable, in the event that neither said first search point nor said third search point can be detected, and only said second search point is detected within a search area, to set a tracking phase at a search point at which said composite envelope value attains a maximum value, as said reference tracking phase.

6. The automatic tracking control system as claimed in claim 3, wherein said reference tracking phase setting means is operable, in the even that said first search point could be detected, and said second search point could not be detected within a search area, to detect, after the direction of the search has been reversed, a fourth search point at which said composite envelope value attains a value smaller than the maximum value of said discriminating value and also operable, in the event that said composite envelope value detected up to said fourth search point exhibits a single peak characteristic curve, to set a tracking phase at the search point at which the maximum value thereof has been detected, as said reference tracking phase.

7. The automatic tracking control system as claimed in claim 6, wherein said reference tracking phase setting means is operable, in the event that said composite envelope value detected up to said fourth search point within said search area does not exhibit a single peak characteristic curve, to set as said reference tracking phase a tracking phase at a search point nearest to said fourth search point at which one of the peak values of said composite envelope value has been detected.

8. The automatic tracking control system as claimed in claim 3, wherein said reference tracking phase setting means is operable, in the even that said composite envelope value detected does not exhibit a single peak characteristic curve, and said second search point has been detected, to detect, after the direction of search has been reversed, a fifth search point at which said discriminating value attains a value updated to a value greater than a maximum discriminating value, thereby to set as said reference tracking phase a tracking phase which has been withdrawn a predetermined amount from the tracking phase at said fifth search point.

9. The automatic tracking control system as claimed in claim 1, wherein the magnetic recording and/or reproducing apparatus is of a type having a triple-level recording capability wherein the audio signal is recorded on the inner stratum of a length of magnetic recording medium, a luminance signal is recorded on the outer stratum of the same length of magnetic recording medium and a PCM color signal is recorded on a stratum of the same length of magnetic recording medium intermediate the inner and outer strata at a track width different from that for the audio signal.

10. A method of automatic tracking control for use in a magnetic recording/reproducing medium comprising the steps of:
envelope detecting envelope voltage values of an audio signal and a video signal recorded along a search area of a magnetic recording medium;
summing respective pairs of said envelope voltage values of said audio signal and said video signal at a plurality of search points within said search area to develop a composite envelope;
searching along said composite envelope in a first direction and a second direction for a preferred maximum value of said composite envelope;
determining a reference tracking phase based upon said preferred maximum value of said composite envelope in order to output a synthesized tracking control signal; and
controlling a tracking phase of a rotary head assembly based upon said synthesized tracking control signal to attain optimum tracking.

11. The method of automatic tracking control of claim 10 wherein said searching comprises the steps of:
a) designating a search starting point along said composite envelope;
b) subtracting a pedetermined value from about composite envelope at said search starting point to provide a difference value; and
c) determining if said difference value is greater or lesser than a determining value wherein if said difference value is less than said determining value, said difference value is designated as said determining value and a tracking phase of said composite envelope is charged by an incremental value in said first direction and said searching of steps a) through c) is repeated.

12. The method of automatic tracking control of claim 11 wherein steps a) through c) are repeated and when it is determined that no maximum value of said composite envelope exists in said first direction, a search point at which said composite envelope becomes equal to said difference value of said search starting point is designated as search point A.

13. The method of automatic tracking control of claim 12, in which once said search point A is determined comprises the further steps of:
d) changing the tracking phase of said composite envelope by said incremental value in said second direction, from said composite envelope at said search point A, to a new search point;
e) determining a difference value of said new search point; and
f) comparing said difference value at said search point A, which is considered as said determining value, to said difference value of said new search point, wherein if said difference value is greater than or equal to said determining value, said difference value is designated as said determining value and the tracking phase of said composite envelope is changed by said incremental value in said second direction and searching of steps d) through f) is repeated.

14. The method of automatic tracking control of claim 13 wherein steps d) through f) are repeated and when it is determined that a difference value of a search point is less than a current determining value, a search point at which said composite envelope becomes equal to said difference value of said search point which is less than said current determining value, is designated as search point B.

15. The method of automatic tracking control of claim 14 wherein a search point C, which is the midpoint between said search points A and B, is designated as said preferred maximum value of said composite envelope.

16. The method of automatic tracking control of claim 15 wherein said video signal is a PCM color signal; said envelope detecting step further comprises detecting envelope values of a luminance signal; and said summing step further comprises summing respective said audio signals, said PCM color signals, and said luminance signals at said plurality of search points to develope said composite envelope.

17. The method of automatic tracking control of claim 10 wherein said step of summing further comprises attenuating said envelope voltage values of said audio signals and said video signals, wherein said envelope voltage values of said video signals are attenuated to a greater degree to weight tracking of said audio signals.

18. The method of automatic tracking control of claim 10 further comprising the step of determining a difference between values of said composite envelope at said search point A and said search point B wherein if said determined difference is less than a predetermined difference, a search point C, which is midpoint between said search points A and B, is designated as said preferred maximum value of said composite envelope, and if said determined difference is greater than said predetermined difference, searching of said composite envelope is continued from said search point B in said first direction for a search point D in which said composite envelope is equal in value to said composite envelope at said search point B and wherein a search point E which is midpoint between said search points B and D is designated as said preferred maximum value of said composite envelope.

19. The method of automatic tracking control of claim 14 wherein if a subsequent difference value of a search point is determined to be greater than a current determining value searching of steps d) through f) is repeated to find a new search point B;

searching is continued in said second direction from said new search point B for a search point D in which said composite envelope is equal to said composite envelope at said new search point B; and a search point E, which is midpoint between said search points B and D, is designated as said preferred maximum value of said composite envelope.

20. An automatic tracking control system for use in a magnetic recording/reproducing apparatus comprising:

envelope detecting means for detecting envelope voltage values of an audio signal and a video signal recorded along a search area of a length of magnetic recording medium;

tracking control signal synthesizing means, coupled to said envelope detecting means, for summing respective pairs of said envelope voltage values of said audio signal and said video signal at a plurality of search points within said search area to develop a composite envelope, searching along said composite envelope in a first direction and a second direction for a preferred maximum value of said composite envelope, and determining a reference tracking phase based upon said preferred maximum value of said composite envelope in order to output a synthesized tracking control signal; and servo control means for controlling a tracking phase of a rotary head assembly based upon said synthesized tracking control signal to attain optimum tracking.

21. The automatic tracking control system of claim 20 wherein said tracking control signal synthesizing means is operable to:

a) designate a search starting point along said composite envelope;

b) subtract a predetermined value from said composite envelope at said search starting point to provide a difference value; and c) determine if said difference value is greater or less than a determining value wherein if said difference value is less than said determining value, said difference value is designated as said determining value and a tracking phase of said composite envelope is changed by an incremental value in said first direction wherein operations a) through c) are repeated.

22. The automatic tracking control system of claim 21 wherein said tracking control signal synthesizing means is operable to repeated operations a) through c) and is also operable when it is determined that no maximum value of said composite envelope exists in said first direction, to designate a search point at which said composite envelope becomes equal to said difference value of said search starting point as search point A.

23. The automatic tracking control system of claim 22 in which once said search point A is determined, said tracking control signal synthesizing means is further operable to, d) change the tracking phase of said composite envelope by said incremental value in said second direction, from said composite envelope at said search point A, to a new search point;

e) determine a difference value of said new search point;

f) compare said difference value at said search point A, which is considered as said determining value, to said difference value of said new search point wherein if said difference value is greater than or equal to said determining value, said difference value is designated as said determining value and the tracking phase of said composite envelope is changed by said incremental value in said second direction and operations d) through f) are repeated.

24. The automatic tracking control system of claim 23 wherein said tracking control signal synthesizing means is operable to repeated operations d) through f) and is also operable when it is determined that a difference value of a search point is less than a current determining value, to designate a search point at which said composite envelope becomes equal to said difference value of said search point which is less than said current determining value, as search point B.

25. The automatic tracking control system of claim 24 wherein said tracking control signal synthesizing means is further operable to designate a search point C, which is the midpoint between said search points A and B, as said preferred maximum value of said composite envelope.

26. The automatic tracking control system of claim 25 wherein said video signal is a PCM color signal; said envelope detecting means further detects envelope values of a luminance signal; and said tracking control signal synthesizing means is operable to sum respective said audio signals, said PCM color signals, and said luminance signals at said plurality of search points to develope said composite envelope.

27. The automatic tracking control system of claim 20 wherein said tracking control signal synthesizing means is further operable to attenuate said envelope voltage values of said audio signals and said video signals, wherein said envelope voltage values of said video signals are attenuated to a greater degree to weight tracking of said audio signals.

28. The automatic tracking control system of claim 20 wherein said tracking control signal synthesizing means is further operable to determine a difference between values of said composite envelope at said search point A and said search point B wherein
- if said determined difference is less than a predetermined difference, a search point C, which is midpoint between search points A and B, is designated as said preferred maximum value of said composite envelope, and
- if said determined difference is greater than said predetermined difference, searching of said composite envelope is continued from said search point B in said first direction for a search point D in which said composite envelope is equal in value to said composite envelope at said search point B and wherein a search point E which is midpoint between said search points B and D is designated as said preferred maximum value of said composite envelope.

29. The automatic tracking control system of claim 24 wherein said tracking control signal synthesizing means is operable if a subsequent difference value of a search point is determined to be greater than a current determining value to
- repeat operations d) through f) to find a new search point B;
- continue searching in said second direction from said new search point B for a search point D in which said composite envelope is equal to said composite envelope at said new search point B; and
- designate a search point E, which is midpoint between said search points B and D, as said preferred maximum value of said composite envelope.

* * * * *